(12) United States Patent
Teo et al.

(10) Patent No.: US 9,112,897 B2
(45) Date of Patent: Aug. 18, 2015

(54) SYSTEM AND METHOD FOR SECURING A NETWORK SESSION

(75) Inventors: Wee Tuck Teo, Singapore (SG); Teck Kang Toh, Singapore (SG); Hyung Hwan Chung, Singapore (SG)

(73) Assignee: Advanced Network Technology Laboratories Pte Ltd., Singapore (SG)

( * ) Notice: Subject to any disclaimer, the term of this patent is extended or adjusted under 35 U.S.C. 154(b) by 889 days.

(21) Appl. No.: 12/139,422

(22) Filed: Jun. 13, 2008

(65) Prior Publication Data

US 2009/0037976 A1    Feb. 5, 2009

Related U.S. Application Data

(63) Continuation-in-part of application No. 11/694,476, filed on Mar. 30, 2007.

(60) Provisional application No. 60/943,780, filed on Jun. 13, 2007, provisional application No. 60/787,457, filed on Mar. 30, 2006, provisional application No. 60/814,828, filed on Jun. 19, 2006.

(51) Int. Cl.
*G06F 17/00* (2006.01)
*H04L 29/06* (2006.01)
*G06F 21/56* (2013.01)
*H04L 29/08* (2006.01)

(52) U.S. Cl.
CPC .......... *H04L 63/1441* (2013.01); *G06F 21/566* (2013.01); *H04L 63/102* (2013.01); *H04L 67/02* (2013.01); *G06F 2221/2119* (2013.01); *H04L 63/08* (2013.01)

(58) Field of Classification Search
CPC ..... G06F 21/604; G06F 21/566; H04L 63/20; H04L 63/1441; H04L 63/02; H04W 12/08
USPC .................... 726/1, 25–26; 713/170; 380/286
See application file for complete search history.

(56) References Cited

U.S. PATENT DOCUMENTS

| | | | |
|---|---|---|---|
| 5,039,921 A | 8/1991 | Kakitani et al. | |
| 5,932,976 A | 8/1999 | Maheshwari et al. | |
| 5,983,348 A | 11/1999 | Ji | |
| 6,178,244 B1 | 1/2001 | Takeda et al. | |
| 6,732,279 B2 | 5/2004 | Hoffman | |
| 6,772,345 B1 | 8/2004 | Shetty | |
| 6,866,581 B2 | 3/2005 | Martinek et al. | |
| 6,871,192 B2 | 3/2005 | Fontana et al. | |
| 6,968,462 B2 | 11/2005 | Challener et al. | |
| 7,080,407 B1 | 7/2006 | Zhao et al. | |
| 7,086,086 B2 | 8/2006 | Ellis | |
| 7,181,415 B2 | 2/2007 | Blaser et al. | |
| 7,249,380 B2 * | 7/2007 | Yang | 726/25 |

(Continued)

OTHER PUBLICATIONS

PCT/US07/07994 (Srch. Rpt.), Jan. 29, 2008, Antlabs.

(Continued)

*Primary Examiner* — Saleh Najjar
*Assistant Examiner* — Feliciano Mejia
(74) *Attorney, Agent, or Firm* — Sheppard, Mullin, Richter & Hampton LLP

(57) ABSTRACT

A system comprises an end-user device including a browser and a security component capable of executing a security policy, the security policy to be downloaded from a website; and a website including a security policy downloadable to the security component.

23 Claims, 23 Drawing Sheets

(56) References Cited

U.S. PATENT DOCUMENTS

| | | |
|---|---|---|
| 7,269,851 B2 | 9/2007 | Ackroyd |
| 7,325,193 B2 * | 1/2008 | Edd et al. ............... 715/255 |
| 7,353,533 B2 | 4/2008 | Wright et al. |
| 7,392,534 B2 | 6/2008 | Lu et al. |
| 7,418,504 B2 | 8/2008 | Larson et al. |
| 7,478,420 B2 | 1/2009 | Wright et al. |
| 7,516,476 B1 | 4/2009 | Kraemer et al. |
| 7,591,002 B2 * | 9/2009 | Shelest et al. ............... 726/1 |
| 7,685,179 B2 | 3/2010 | MacCormick |
| 7,685,279 B2 | 3/2010 | Miltonberger |
| 7,716,731 B2 * | 5/2010 | Short et al. ............... 726/14 |
| 7,827,611 B2 | 11/2010 | Kouznetsov et al. |
| 7,882,396 B2 | 2/2011 | Bolignano et al. |
| 2002/0004902 A1 * | 1/2002 | Toh et al. ............... 713/170 |
| 2002/0029342 A1 | 3/2002 | Keech |
| 2002/0166063 A1 | 11/2002 | Lachman et al. |
| 2002/0184255 A1 * | 12/2002 | Edd et al. ............... 707/500 |
| 2003/0002072 A1 * | 1/2003 | Berkema et al. ............ 358/1.15 |
| 2003/0005044 A1 * | 1/2003 | Miller et al. ............... 709/203 |
| 2003/0037142 A1 | 2/2003 | Munger et al. |
| 2003/0079143 A1 | 4/2003 | Mikel et al. |
| 2003/0093400 A1 * | 5/2003 | Santosuosso ............... 707/1 |
| 2003/0120605 A1 | 6/2003 | Fontana et al. |
| 2003/0131249 A1 | 7/2003 | Hoffman |
| 2003/0154293 A1 * | 8/2003 | Zmolek ............... 709/228 |
| 2003/0159070 A1 | 8/2003 | Mayer et al. |
| 2003/0177389 A1 * | 9/2003 | Albert et al. ............... 713/201 |
| 2004/0034794 A1 | 2/2004 | Mayer et al. |
| 2004/0064335 A1 * | 4/2004 | Yang ............... 705/1 |
| 2004/0088570 A1 * | 5/2004 | Roberts et al. ............... 713/201 |
| 2004/0098485 A1 | 5/2004 | Larson et al. |
| 2004/0123153 A1 | 6/2004 | Wright et al. |
| 2004/0249974 A1 | 12/2004 | Alkhatib et al. |
| 2005/0055578 A1 | 3/2005 | Wright et al. |
| 2005/0066186 A1 | 3/2005 | Gentle et al. |
| 2005/0071282 A1 | 3/2005 | Lu et al. |
| 2005/0138395 A1 | 6/2005 | Benco et al. |
| 2005/0149726 A1 | 7/2005 | Joshi et al. |
| 2005/0172015 A1 | 8/2005 | Rana et al. |
| 2005/0183143 A1 | 8/2005 | Anderholm et al. |
| 2005/0216957 A1 | 9/2005 | Banzhof et al. |
| 2005/0229250 A1 | 10/2005 | Ring et al. |
| 2005/0269969 A1 | 12/2005 | Van Casteren |
| 2006/0010252 A1 | 1/2006 | Miltonberger et al. |
| 2006/0031940 A1 | 2/2006 | Rozman et al. |
| 2006/0036731 A1 | 2/2006 | Mossman et al. |
| 2006/0064755 A1 | 3/2006 | Azadet et al. |
| 2006/0090196 A1 | 4/2006 | van Bemmel et al. |
| 2006/0101128 A1 | 5/2006 | Waterson |
| 2006/0101282 A1 | 5/2006 | Costea et al. |
| 2006/0130141 A1 | 6/2006 | Kramer et al. |
| 2006/0143700 A1 * | 6/2006 | Herrmann ............... 726/14 |
| 2006/0143706 A1 | 6/2006 | Kawasaki et al. |
| 2006/0185015 A1 | 8/2006 | Cheston et al. |
| 2006/0206485 A1 * | 9/2006 | Rubin et al. ............... 707/9 |
| 2006/0206936 A1 | 9/2006 | Liang et al. |
| 2006/0224753 A1 | 10/2006 | Hama et al. |
| 2006/0236391 A1 | 10/2006 | Kim et al. |
| 2006/0259967 A1 | 11/2006 | Thomas et al. |
| 2006/0265761 A1 | 11/2006 | Rochette et al. |
| 2006/0279229 A1 | 12/2006 | Okawa |
| 2006/0282876 A1 * | 12/2006 | Shelest et al. ............... 726/1 |
| 2007/0011741 A1 | 1/2007 | Robert et al. |
| 2007/0022287 A1 | 1/2007 | Beck et al. |
| 2007/0036300 A1 | 2/2007 | Brown et al. |
| 2007/0055711 A1 | 3/2007 | Polyakov et al. |
| 2007/0067833 A1 | 3/2007 | Colnot |
| 2007/0094496 A1 | 4/2007 | Burtscher |
| 2007/0094723 A1 | 4/2007 | Short et al. |
| 2007/0101435 A1 | 5/2007 | Konanka et al. |
| 2007/0162975 A1 | 7/2007 | Overton et al. |
| 2007/0182714 A1 | 8/2007 | Pemmaraju |
| 2007/0199044 A1 * | 8/2007 | Hughes ............... 726/1 |
| 2007/0234061 A1 | 10/2007 | Teo |
| 2007/0240212 A1 | 10/2007 | Matalytski |
| 2007/0245343 A1 | 10/2007 | Shannon et al. |
| 2007/0271189 A1 | 11/2007 | Morten et al. |
| 2008/0016339 A1 | 1/2008 | Shukla |
| 2008/0034419 A1 | 2/2008 | Mullick et al. |
| 2008/0040800 A1 | 2/2008 | Park |
| 2009/0037973 A1 | 2/2009 | Gustave et al. |
| 2009/0044266 A1 | 2/2009 | Sharp et al. |
| 2009/0187763 A1 | 7/2009 | Freericks et al. |
| 2009/0187991 A1 | 7/2009 | Freericks et al. |
| 2009/0267528 A1 | 10/2009 | Nijhof et al. |
| 2010/0045196 A1 | 2/2010 | Breuer et al. |
| 2011/0037406 A1 | 2/2011 | Matsuzaki et al. |

OTHER PUBLICATIONS

PCT/US07/07994 (Written Opinion), Jan. 29, 2008, Antlabs.

PCT International Search Report and Written Opinion dated Oct. 20, 2008, for International Application No. PCT/US2008/067031.

PCT International Search Report and Written Opinion dated Jan. 29, 2008, for International Application No. PCT/US2007/07994.

Greenborder Pro 2.9 Article—Reviews by PC Magazine (PCMAG.com), Reviewed on (Jun. 24, 2006) Found on www on Apr. 30, 2008 at http://www.pcmag.com/article2/0,2704,1980991,00.asp.

Office Action mailed Apr. 9, 2010 from U.S. Appl. No. 11/694,476, filed Mar. 30, 2007.

Wenjie, Liu et al., "Communication and Recovery Issues in Grid Environment," Proceedings of the 3rd International Conference on Information Security, pp. 82-86, Nov. 14, 2004.

Williamson, Matthew M., "Throttling Viruses: Restricting Propagation to Defeat Malicious Mobile Code," Proceedings of the 18th Annual Computer Security Applications Conference, Dec. 9, 2002.

* cited by examiner

EXAMPLE TRANSACTION

SYSTEM AND METHOD FOR SECURING A NETWORK SESSION

PRIORITY CLAIM

This application claims benefit of provisional patent application Ser. No. 60/943,780, entitled "Website Session Security," filed on Jun. 13, 2007 by Wee Tuck Teo, Teck Kang Toh and Hyung Hwan Chung; and is a continuation-in-part of Ser. No. 11/694,476, entitled "System and Method for Providing Transaction Security for an End-User Device," filed on Mar. 30, 2007, by Wee Tuck Teo; which claims benefit of provisional patent application Ser. No. 60/787,457, entitled "Trusted Network Transaction," filed on Mar. 30, 2006, by inventor Wee Tuck Teo and of provisional patent application Ser. No. 60/814,828, entitled "End Point Remote Data Exchange Security," filed on Jun. 19, 2006, by inventor Wee Tuck Teo, each of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to network systems, and more particularly provides a system and method for securing a network session.

BACKGROUND

Security is a key concern during online transactions. Commercial Internet transactions, e.g., Internet banking, credit card purchases, etc., are only as secure as the weakest link. Traditional security solutions focus on server-side infrastructure security, e.g., HTTPS, two-factor authentication, etc. While the server side has security expert management and maintenance, the end user's computers do not have such benefit.

Current online transaction risks increase due to poor end user security practices. The current solution to end user security tends to focus on end user education, e.g., training end users to recognize phishing attempts and ignore spoofed emails, and installing end-user security software to clean up and secure end-user devices from malicious code, e.g., viruses, spyware, adware, keyloggers, backdoors, Trojans, etc. Solving the end-user device vulnerabilities using the above approach is dependent on end-user efforts, e.g., regular installation of security software updates such as signature files, regular execution of scans, regular application of the security patches, etc.

Additionally, the generally open nature of the Internet makes shared Internet resources, e.g., DNS servers, intermediate routers, etc., susceptible to web site hijacking. Shared Internet resources are not managed by web site owners or end users, making securing these shared resources outside the control of the stakeholders.

A system and method that facilitates network security sessions are needed.

SUMMARY

Per one embodiment, the present invention provides a system comprising an end-user device including a browser and a security component capable of executing a security policy, the security policy to be downloaded from a website; and a website including a security policy downloadable to the security component. The security component may download the security policy from the website upon connection to the main server. The security component may activate a security mechanism upon detection of a trigger point. The trigger point may include an explicit trigger point, e.g., a metatag embedded in the website. The metatag may be associated with a particular security mechanism. The trigger point may include an implicit trigger point, e.g., recognition of an event. The security component may connect to the website via a point-to-point tunnel before downloading the security policy. The website may include an integrity checksum embedded in the website. The security component may include a website integrity checker to use the integrity checksum to confirm that the website has not been modified during transport. The security policy may identify alias and affiliate servers where the browser may navigate without raising concern.

Per one embodiment, the present invention provides a method comprising using a browser to navigate to a website, the website including a downloadable security policy; and using a security component to download the security policy from the website and to effect the security policy while navigating the website. The using the security component to download the security policy from the website may occur upon connection to the main server. The method may further comprise activating a security mechanism upon detection of a trigger point. The trigger point may includes an explicit trigger point. The explicit trigger point may include a metatag embedded in the website. The metatag may be associated with a particular security mechanism. The trigger point may include an implicit trigger point. The implicit trigger point may include recognition of an event. The method may further comprise connecting to the website via a point-to-point tunnel before downloading the security policy. The website may include an integrity checksum embedded in the website, and the method may further comprise using the integrity checksum to confirm that the website has not been modified during transport. The security policy may identify alias and affiliate servers where the browser may navigate without raising concern.

Per one embodiment, the present invention may provide a system comprising means for navigating to a website, the website including a downloadable security policy; means for downloading the security policy from the website; and means for effecting the security policy while navigating the website.

DETAILED DESCRIPTION

The following description is provided to enable any person skilled in the art to make and use the invention and is provided in the context of a particular application. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Figure 1:
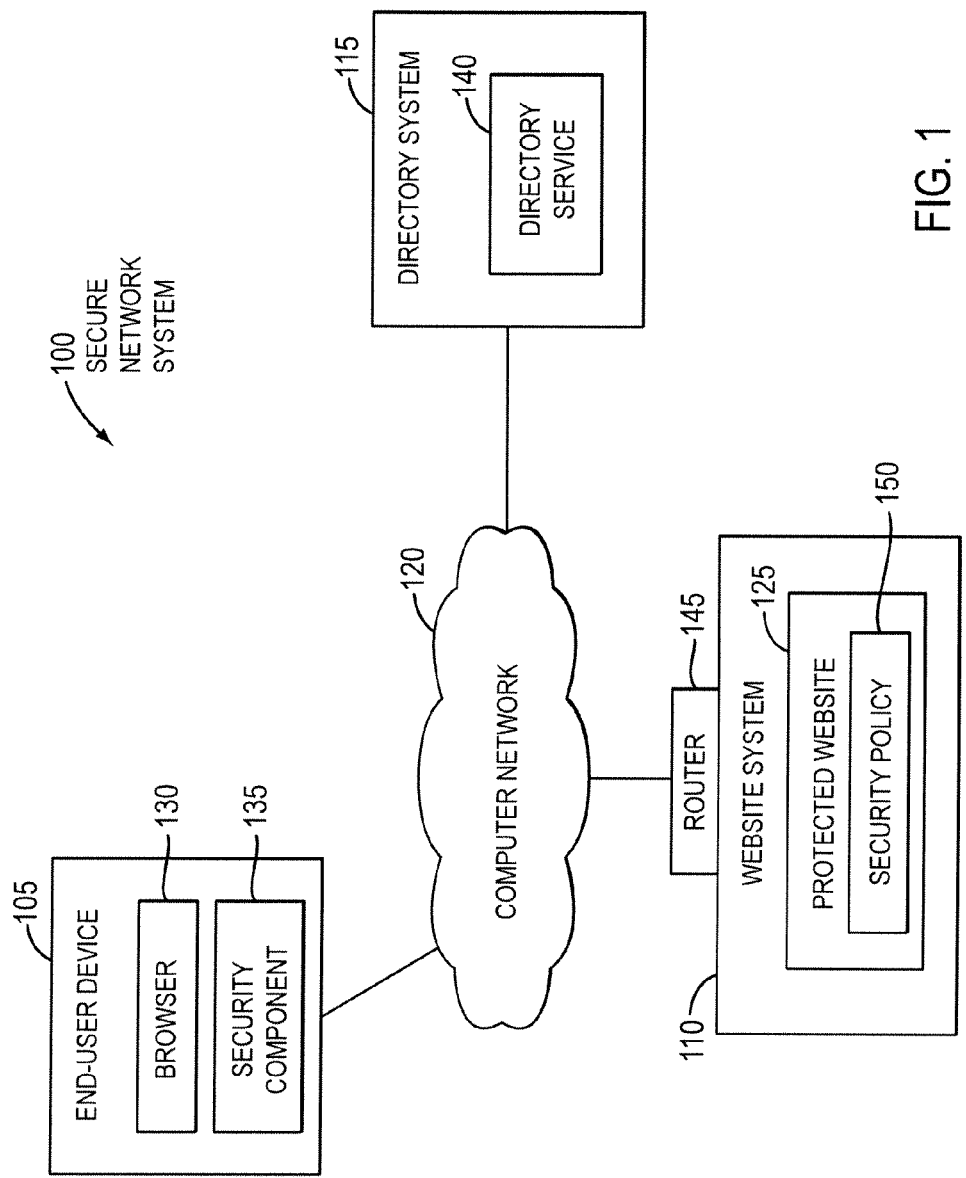
FIG. 1 is a block diagram of a secure network system, in accordance with an embodiment of the present invention.

FIG. 1 is a block diagram of a secure network system 100, in accordance with an embodiment of the present invention. The secure network system 100 includes an end-user device 105, a website system 110, and a directory system 115, each coupled together via a computer network 120 such as the Internet. The end-user device 105 includes a browser 130 and a security component 135. The website system 110 includes a protected website 125 with a security policy 150, and coupled to the computer network 120 via a router 145. The directory system 115 includes a directory service 140.

The end-user device 105 may include a laptop, desktop, PDA, cell phone, etc. The browser 130 enables the end user to navigate about the computer network 120 to websites such as to the protected website 125 on the website system 110. The security component 135 cooperates with the protected website 125 and with the directory system 115 to protect website sessions between the end-user device 105 and the protected website 125.

In one embodiment, the security component 135 determines whether a requested URL is associated with a blacklisted site (websites known to be malicious, e.g., phishing sites), a whitelisted site (websites providing website session security, e.g., for banks/financial institutions), or an unlisted site (e.g., a conventional site that is not a blacklisted nor a whitelisted site). If the site is blacklisted, then in one embodiment the end user device 105 first confirms that the user wishes to navigate to the site. If the site is whitelisted, then the end-user device 105 establishes a site-specific anti-hijack GRE tunnel to the website system 110, retrieves the security policy 150 from the protected website 125, and activates lockdown policies (e.g., unhooking keyloggers, blocking file/process commands, and establishing global anti-hijack GRE tunnel) according to the security policy 150.

The website system 110 (e.g., an Internet banking site, eCommerce site, etc.) manages the protected website 125. The website system 110 may be located in a "de-militarized zone." The internet router 145 may support tunneling (e.g., GRE tunneling).

The directory service 140 may be a hosted service, in one embodiment, operative to compare a requested URL against known blacklisted and whitelisted websites. The directory service 140 enables accurate DNS resolution. For scalability and availability, the directory service 110 may be distributed across multiple data centers as well as deployed on content delivery networks such as Akamai.

Figure 2A:
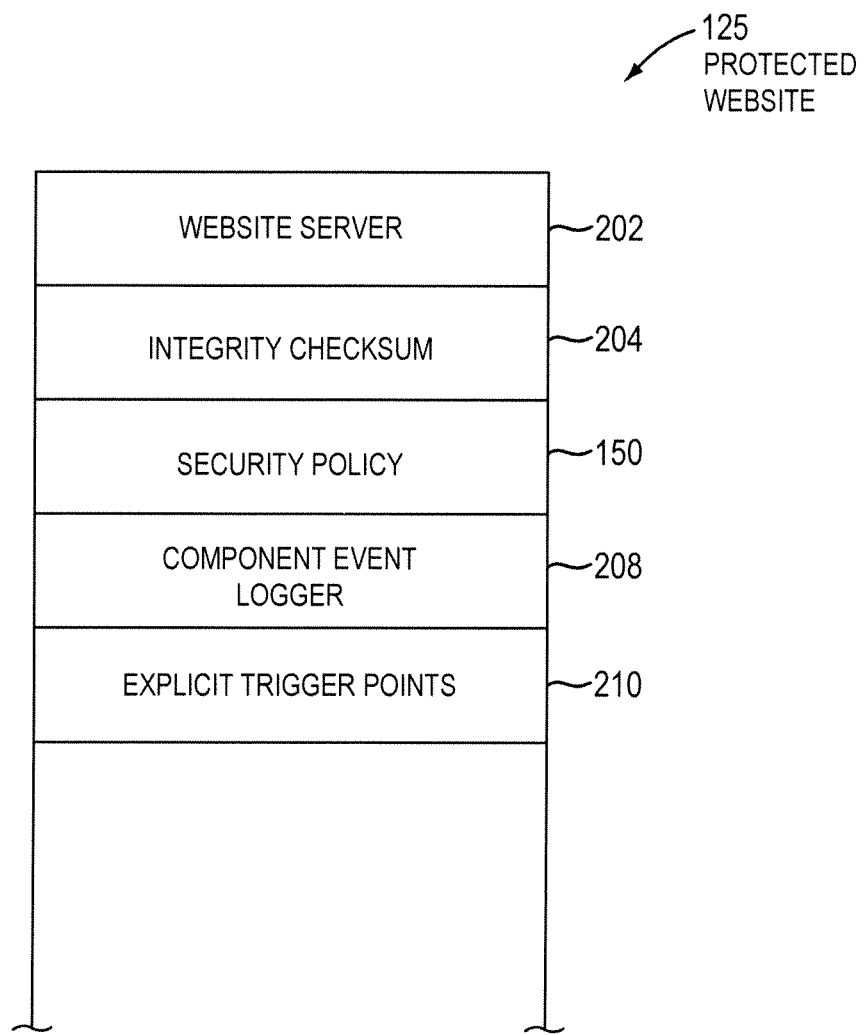
FIG. 2(a) is a block diagram illustrating details of the protected website of FIG. 1, in accordance with an embodiment of the present invention.

FIG. 2(a) is a block diagram illustrating details of the directory service 105, in accordance with an embodiment of the present invention. The directory service 105 includes a directory service server 212 having a TCP request server 220, a UDP request server 222, a component event logger 224 and a component update engine 226. The directory service 105 also includes a directory service engine 214 having a blacklist engine 228, a whitelist engine 230 and a directory updater 232. The directory service 105 also includes a full directory file 216 and an incremental directory file 218.

Figure 2B:
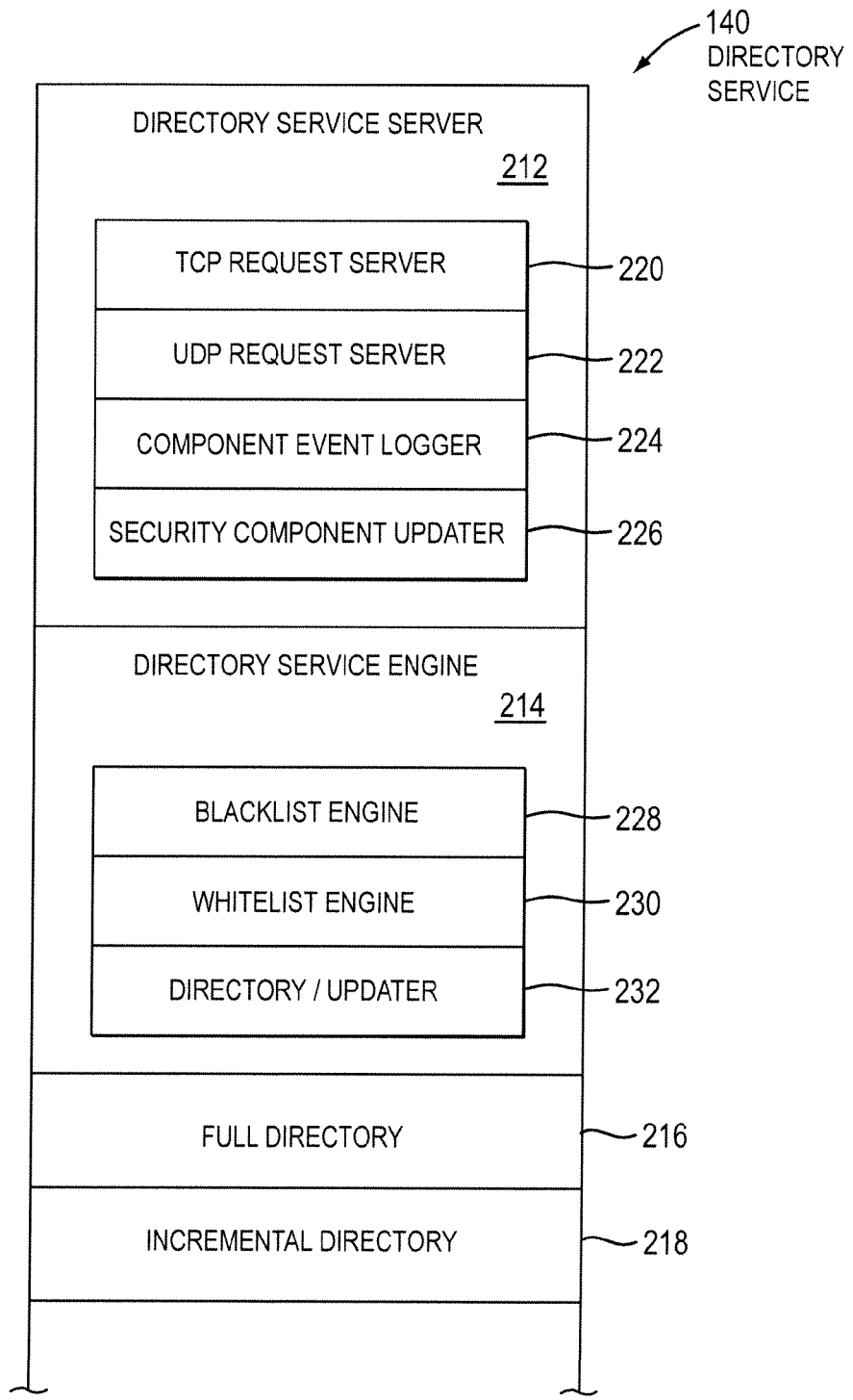
FIG. 2(b) is a block diagram illustrating details of the directory service of FIG. 1, in accordance with an embodiment of the present invention.

FIG. 2(b) is a block diagram illustrating details of the protected website 110, in accordance with an embodiment of the present invention. The protected website 110 includes a website management console 202, security policy 150, an integrity checksum 206, a component event logger 208 and explicit trigger points 210.

Figure 2C:
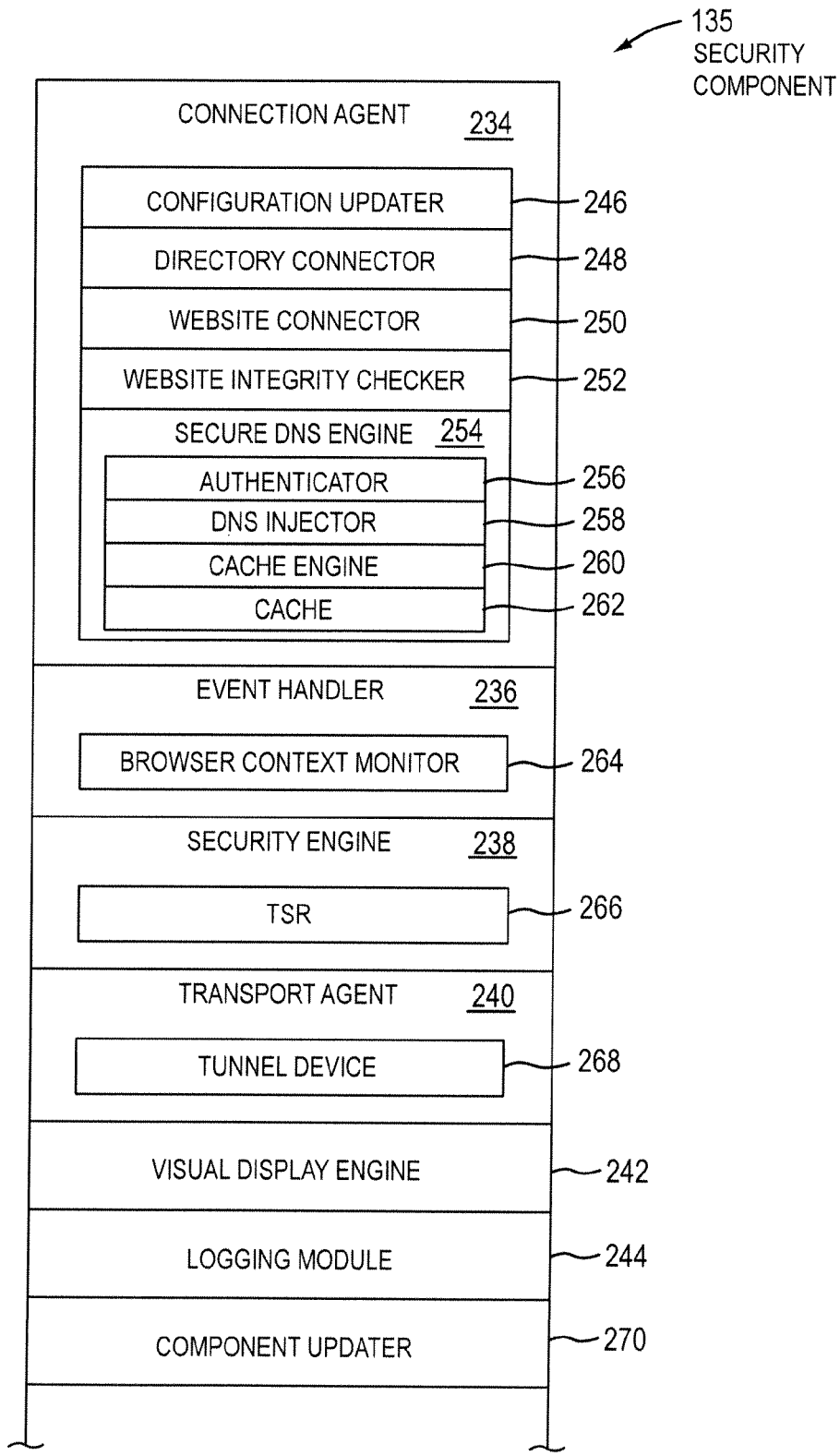
FIG. 2(c) is a block diagram illustrating details of the security component of FIG. 1, in accordance with an embodiment of the present invention

FIG. 2(c) is a block diagram illustrating details of the security component 135, in accordance with an embodiment of the present invention. The security component 205 includes a connection agent 234, an event handler 236, a security engine 238, a transport agent 240, a visual display engine 242, a logging module 244, and a component updater 270. The connection agent 234 includes a configuration updater 246, a directory connector 248, a website connector 250, a website integrity checker 252 and a secure DNS 254. The secure DNS 254 includes an authenticator 256, a cache updater 258, a directory caching engine 260, and a cache 262. The event handler 236 includes a browser content monitor 264. The security engine 238 includes a TSR 266. The transport agent 240 includes a runnel device 268.

Referring to FIGS. 2(a), 2(b) and 2(c), in one embodiment, the directory connector 248 connects with the directory service 140 specified in the preference setting (e.g., Akamai, the data center with the lowest latency, etc.), e.g., upon system bootup. The directory connector 248 may perform a UDP ping on the list of data centers to determine the one with the lowest latency, etc. The UDP request server 222 responds to the UDP ping by the directory connector 248. The configuration updater 246 may update the global setting accordingly.

Upon connection, the component updater 270 of the security component 135 checks with the security component updater 226 of directory service 140 to determine if a newer version of the security component 135 is available. If so, the component updater 270 updates the security component 135. The cache engine 260 of the security component 135 communicates with the security component updater 226 of the directory service 140 to update the cache 262 with blacklisted and whitelisted site updates, possibly only those updates relevant to the particular end user, thereby refreshing DNS cache entries.

When the user requests a website, the cache engine 260 queries its cache for the hostname. If the hostname is not stored in the cache 262, the cache engine 260 queries the directory service engine 214 to resolve the requested hostname. The directory service engine 214 examines the full directory 216 to determine if the requested website pertains to a blacklisted or whitelisted site. If the requested hostname belongs to a blacklisted site, the security engine 238 instructs the visual display engine 242 to display a warning message to alert the user. If the requested hostname is unlisted, the website connector 250 conducts normal DNS resolution and HTTP operations to connect to the website. The website server 202 presents the website. Regardless, the cache engine 260 caches the new directory information in the cache 262.

If the hostname relates to a whitelisted site, the security engine 238 initiates a secure transaction. The security engine 238 instructs the transport agent 240, which uses the tunnel device 268, to establish a site-specific anti-hijack tunnel (GRE/IPIP) to the router 145. The security engine 238 downloads the security policy 150, the authenticator 256 verifies the SSL certificate, the security engine 238 confirms that the user wishes to initiate a secure session, and (assuming confirmed) the security engine 238 instructs the TSR 266 to initiate session lockdown policies (e.g., unhooks keyloggers, applies site-specific file/program lockdown policies, activates a global anti-hijack tunnel to direct all other non protected site-specific traffic through it, etc.) according to the security policy 150. The website server 202 presents the Website.

The TSR 266 is a kernel module that is loaded upon system bootup. It intercepts the system calls of the underlying operating system, inspects them and changes their behavior to control their use by programs running on the operating system to achieve the required protection. It controls the system calls related to new process initialization control, file access (open/write/rename) control, registry access (open/write/rename) control windows file sharing access (open/write/rename) control, removable device control, copy and paste control, screen capture (printscreen) control, system printer control, and restrict network data routed only to specific network location (IP address).

In one embodiment, the security engine 238 instructs the transport agent 240 to route requests to the router 145 though the anti-hijack tunnel, and to receive responses via the existing internet route, possibly using existing security mechanism like HTTPS to secure transactions of sensitive and important applications. The protected website 125 may use a signing component for non-HTTPS traffic to sign the generated web page. The website integrity checker 252 may perform an integrity check on the integrity checksum 204 to ensure that a downloaded web page is not modified.

The component event logger 208 of the protected website 125 may monitor end-user behavior for a variety of reasons, e.g., to identify malicious behavior, to review past behavior if later determined to be malicious, to; monitor for marketing possibilities, etc. The component event logger 224 of the directory service may monitor access behavior for a variety of reasons, e.g., to identify malicious behavior, to review past behavior if later determined to be malicious, etc. The logging module 244 of the security component 244 may monitor access behavior for a variety of reasons, e.g., to identify malicious behavior, to review past behavior if later determined to be malicious, etc.

The blacklist engine 228 operates to identify blacklisted sites. The blacklist engine 228 may learn of blacklisted sites from a variety of sources including front companies that monitor for malicious sites from end users who encounter phishing sites, from the security component 135 (e.g., when it recognizes a fake certificate), etc. The whitelist engine 230 operates to identify whitelisted sites. The whitelist engine 230 may learn of such sites as companies install the security package and register their sites with the directory service 140, thereby transforming the previous website to a protected website 125. The directory updater 232 updates the full directory 216 (which includes the full list of all blacklisted and whitelisted sites) and the incremental directory 218 (which includes the delta list of blacklisted and whitelisted sites needing download to the various locations, e.g., to mirror sites, to end-user caches 262, etc.).

Security Triggers

A traditional website browsing session is a well-established concept includes a series of data exchanges between the website system 110 and the end-user device 105. However, traditional website browsing does not define security requirements. Further, there is a lack of holistic overview to define security requirements. For example, computer security technologies like SSL, SSH and PKI only define the protection between the end-user device and each individual server and do not provide a holistic overview of the security requirements of the website. Further, different levels of security and protection may be required when the user performs different tasks on the website. For example, on an eCommerce site like www.bestbuy.com, the user can browse a product catalog for ideas, purchase a product, provide feedback to the website owner, etc. Browsing a product catalog does not typically involve private data and thus requires little to no protection. Submitting feedback involves customer private data, which requires a higher level of protection. Performing an online purchase involves sensitive customer data, which requires the highest level of protection.

Further, cross-site scripting and code injection is hard to detect and prevent. For websites that allows partners or end-users to update content (e.g., ad placement, value added services, posting messages, selling items, etc.), it is difficult to differentiate content posted by partner or users from cross-site scripts and codes injected by malicious hackers. The lack of security tools to detect or prevent such threats poses a risk.

In one embodiment, activation and deactivation of security mechanisms during a website security session can be controlled using activation and deactivation points at different context points of the website session. Example activation and deactivations points can include session (explicit) activation points (e.g., a URL to a whitelisted domain), implicit security trigger (on/off) points (e.g., HTTP mechanisms such as HTTP POST and HTTP to HTTPS transitions, URI or domain migrations, and/or Javascript of AJAX mechanisms (e.g., a new browser window), explicit trigger (on/off) points (e.g., metatags) 210, session transition points (e.g., handover from primary to secondary session; can be recursive), session (implicit) termination points. A break from the above points may indicate the deactivation of the security session.

The security mechanisms can include website and Internet protection, e.g. cross site scripting protection, resource access controls (such as IP, URLs, HREFs), HTML data integrity using checksums, etc.; PG/application protection, e.g., key-logger controls, I/O access controls, browser cache access controls, etc.; and network protection, e.g., network access controls, etc.

In one embodiment, the security policy 150 is defined by the owner or security manager of the protected website 125, since they have the most holistic knowledge of the possible interactions and data exchange. Thus, the owner or security manager can identify the alias and affiliate sites that users are allowed to traverse to, identify the different network and application protection mechanism that are available, and identify the locations within the website when each security and protection mechanism is activated.

In one embodiment, the protected website 125 can adopt a global centralized single policy file model or a federated multiple policy file model. For the single policy file model, a uniform security policy 150 may be enforced throughout the website. For the federated multiple policy file model, individual sections of the website define their own security policies. Each individual section may be managed by a different party. As the user navigates through the different sections of the website, the security engine 238 will obtain and/or use the appropriate security policy files. To avoid unnecessary warnings when navigating the various sections of a protected website 125, e.g., when changing servers, crossing domains, etc., this federated model may encourage the various section owners to define the other sections as aliases and/or affiliates.

Figure 3:
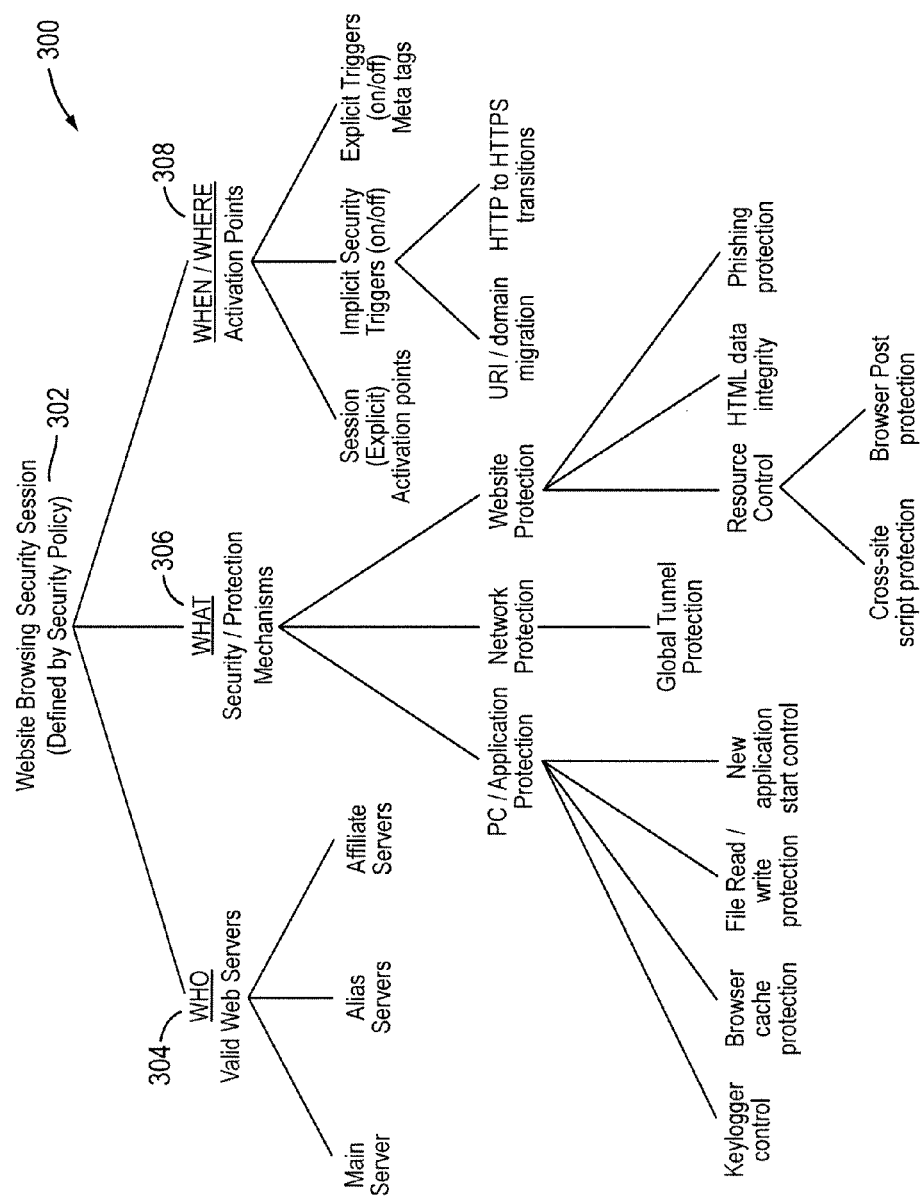
FIG. 3 is a tree-type structure illustrating session security mechanisms, in accordance with an embodiment of the present invention.

FIG. 3 is a hierarchical chart illustrating session security mechanisms 300 defined by the security policy 150 and executed by the security engine 238, in accordance with an embodiment of the present invention. As shown, the security policy 150 defines "WHO" (e.g., which website servers to protect, such as main servers, alias servers, affiliate servers etc.) 304, "WHAT" (e.g., what security mechanisms to execute) 306, and "WHEN/WHERE" (e.g., when/where to activate/deactivate security mechanisms, etc.) 308.

The security policy 150 defines WHO 304, e.g., the group of valid web servers that work in conjunction to provide the website services. More particularly, the website system 110 where the original security policy 150 resides is known as the main server, while all other servers of the website are known as alias servers. Partner servers that provide tangential services for the protected website 125 are known as affiliate servers. For example, for the website "eBay," the main server(s) includes www.ebay.com, alias servers include www.motors.ebay.com and www.express.ebay.com, and affiliate servers include www.paypal.com. www.citibank.com, www.double-click.com, etc.

The security policy 150 defines WHAT 306, e.g., sample types of Internet security and protection mechanisms to enforce at various sections of the browsing session. These security and protection mechanisms may include as follows:

PC/Application Protection
Keylogger Control

A keylogger control mechanism disables common keyloggers from obtaining sensitive information from the protected website 125 during the secure session.

Browser Cache Access Protection

A browser cache access protection mechanism protects cache lists from being read by other programs other than the browser 130. For example, many browsers 130 today cache information retrieved from websites to speed up future retrieval. Sensitive data retrieved and stored in the browser cache can be read by malwares/spywares.

File Read/Write Protection

A file read/write protection mechanism prevents file I/O operations from being executed, except those operations critical for normal system usage and operations.

New Application Start Control

A new application start control protection mechanism prevents new applications, from being launched, except for those critical to system operations and those in the website approved list. This prevents malware/spyware from launching when a secure session is active.

Network Protection
Global Tunnel Protection

A global tunnel protection mechanism causes traffic to be directed through an anti-hijack point-to-point tunnel. In some embodiments, a global tunnel may be established between the end-user device 105 and a network device, such as a router; that, in turn, is in communication with a network. The global tunnel protection mechanism can adopt a compulsory tunnel, where all traffic must be tunneled; a best effort (leaky) tunnel, where traffic will be tunneled when possible and not tunneled if unavailable; or client blocking, where non-website-related traffic are dropped at the source and not transmitted across the network.

Website Protection
Cross-site Script Protection

A cross-site scripting protection mechanism protects against cross-site scripting and code injection. By defining a list of legitimate web servers (e.g., alias and affiliate servers) during a browsing session, the security engine 238 can block or warn the user when it recognizes requests to load information from servers outside the list. Thus, cross-site scripting and code injection attempts can be detected and blocked.

HTML Data Integrity (Checksum)

An HTML data integrity protection mechanism protects against website content tampering. Each web page can be signed and tagged. The website integrity checker 252 can use the integrity checksum 204 to validate each web page to ensure its content has not been modified. This mechanism enables the security engine 238 to recognize web pages modified, e.g., during transport. For more efficient protection, the website integrity checker 252 may check the integrity checksum on only critical portions of a web page demarcated by special tags (e.g., XML, HTML) instead of checking the whole page.

Phishing Protection

A phishing protection mechanism warns the end user when being redirected to a blacklisted site. This alerts end users before potentially accessing a malicious site. Additionally or alternatively, the security policy 150 can block complete access to these blacklisted websites to protect its users.

Browser POST Protection

A browser POST protection mechanism defines valid URLs to which the browser may POST information during the session. Posting data to URLs outside the approved list can be blocked or result in a warning to the user.

The security policy 150 defines WHEN/WHERE 308, e.g., activation points when and where, the different security protection mechanisms are activated. Example ways to represent the activation points include as follows:

Session (Explicit) Activation Points

These activation points automatically trigger when the user surfs to a whitelisted domain or away from it.

URL/Domain Migration Activation Points

These activation points identify specific parts of the protected website 125 when to activate particular mechanisms. For example, Activation point 1—
URL: http://www.ebay.com/processer.asp
Parameters: action=login
Activation point 2—
URL: http://www.ebay.com/process.asp
Parameters: action=logout Implicit HTTP to HTTPS Transition Activation Points These activation points, identify when the user's session transits from HTTP to HTTPS. Typically, websites use HTTPS when the user is accessing web pages where sensitive data is exchanged, for example, during the login phase. Therefore, one implicit mechanism is to identify when the user's browsing session changes from HTTP to HTTPS. Further, when the user's session changes from HTTPS to HTTP, the protection mechanisms can be deactivated.

Explicit Triggers (Meta Tag) Embedded Activation Points

Explicit trigger points 210 may be embedded into the individual web pages of the protected website 125. The explicit trigger points 210 may identify the protection mechanism required for a web page or portion of the web page. When the security engine 238 identifies the trigger point 210, the security engine 238 may activate the identified protection mechanism. The website owner or manager may embed the trigger points 210 with the protection rules into the web pages. Embedded trigger points 210 enables complicated security rules and different protection mechanisms over various sections of a web page.

An example of various activation points and protection mechanisms is described assuming the following:
    Whitelisted site: www.ebav.com
    Alias/Affiliates: www.motor.ebav.com. www.paypal.com
    Post protection URLs; https://www.ebay.com/process-login.cgi, http://www.ebay.com/logout.cgi The user navigates to the whitelisted main domain, e.g., www.ebay.com. A session explicit activation point is triggered, and keylogger control and browser cache access control protection mechanisms are immediately applied. The user clicks on the login link and navigates to the login page. The login page URL is an URL activation point that turns on the protection mechanisms: 'File Read/Write protection' and 'New application start control protection'. On the same page, there may be also Explicit triggers indicating to activate 'Cross-site scripting protection', 'Post protection' and 'Global Tunnel protection'. At this point, maximum protection may be enabled. All user traffic will be tunneled. If there are malwares or cross-site scripts injected to direct the user to a hacker site, e.g., www.ebay-hack.com, the security engine 238 may warn the user before leaving the secure session. The user keys in a user id and password and POSTS to the page https://www.ebay.com/process-login.cgi. The security engine 238 verifies that the URL. is in the POST URL list and is deemed legitimate. After completing the login, the user clicks on the bidding link and the bidding page is loaded. On this page, there may be another explicit trigger point 210 that performs a checksum on a portion of the bidding page that specifies the form POST elements to the page https://www.ebay.com/process-bid.cgi. The 'Data integrity (checksum) protection' mechanism confirms the checksum. The user submits a bid and POST to the page https://www.ebay.com/process-bid.cgi. The security engine 238 performs a checksum on the section of the web page enclosed by the checksum metatag and compares it with the checksum indicated in the page. If the checksum matches, the security engine 238 recognizes that the content from the website system 110 has not been modified during transport and can be trusted. The POST is allowed to go through even though it is not in the POST protection URL list. After submitting the bid, the user clicks on the logout link http://www.ebay.com/logout.cgi. The logout page is loaded, which triggers another Implicit Security Trigger (HTTP transition), because the user is transiting from HTTPS to HTTP: With this trigger, the security engine 238 deactivates all protections.

It will be appreciated that the security engine 238 may cooperate with the event handler 236, which includes a browser context monitor 264 which monitors the context of the browser session. By determining the context, the security engine 238 can determine if implicit triggers have occurred to activate/deactivate security mechanisms.

Once the activation points are defined, the appropriate protection mechanisms can be applied. One potential advantage of many of these approaches (e.g., the implicit triggers and various explicit triggers) is that activation points can be defined without changing the existing website. Operation maintenance of the activation points and rules may be needed when transaction and usage flow on the protected website 125 are changed.

Tunneling

There can be multiple concurrent website secure sessions from the same end-user device 105, while the Internet and each particular website 125 can have multiple secure sessions from multiple end-user devices 105. Besides session dependencies between affiliate and alias domains for session transitions within the same browser window, between live browser windows or among concurrent sessions within the same browser window, there are also session dependencies between protection mechanisms when there are multiple concurrent live security sessions within the same end-user device 105. While there can be multiple live sessions, there is only one active session (particular browser window input entry, e.g. mouse click) with which the end user can interact at a time.

As described in U.S. patent application Ser. No. 11/694, 476, anon-intrusive end-point protection can dynamically activate the anti-hijack point-to-point tunnel during a secure session and deactivate the tunnel when performing non-sensitive tasks. However, when the user establishes multiple concurrent website sessions (e.g., including a mixture of secure and non-secure sessions), a simple global on and off approach for the point-to-point tunnel may be insufficient.

An example to illustrate the issue is presented. The user opens a browser window and surfs to a non-protected site (http://www.non_protected.com). The user opens another browser window and surfs to protected site A (http://www.protected_A.com). When the active session of the web browser is on protected site A, a global point-to-point tunnel to site A is established. The user opens a third browser window and surfs to protected site B (http://www.protected_B.com). The active session of the web browser is now on protected site B. The global point-to-point tunnel to site A turns off. The global point-to-point tunnel to site B turns on. The user then performs a login in protected site B, and immediately switches to the browser window of protected site A without waiting for the login transaction in protected site B to complete. The active session of the web browser is now on protected site A. The global point-to-point tunnel to site B turns off. The global point-to-point tunnel to site A turns on. User login transaction traffic meant for site B is now inadvertently sent through the site A global tunnel. If site A blocks site B's traffic, the login transaction fails. The user performs a login to site A, and immediately switches to the browser window of the non-protected site without waiting for the login transaction in protected site A to complete. The active session of the web browser is now on the non-protected site. The global point-to point tunnel to site A turns off. User login transaction traffic meant for site A is now sent without tunnel anti-hijack protection. Sensitive traffic is now leaked and can be intercepted by man-in-middle attacks.

Figure 4:
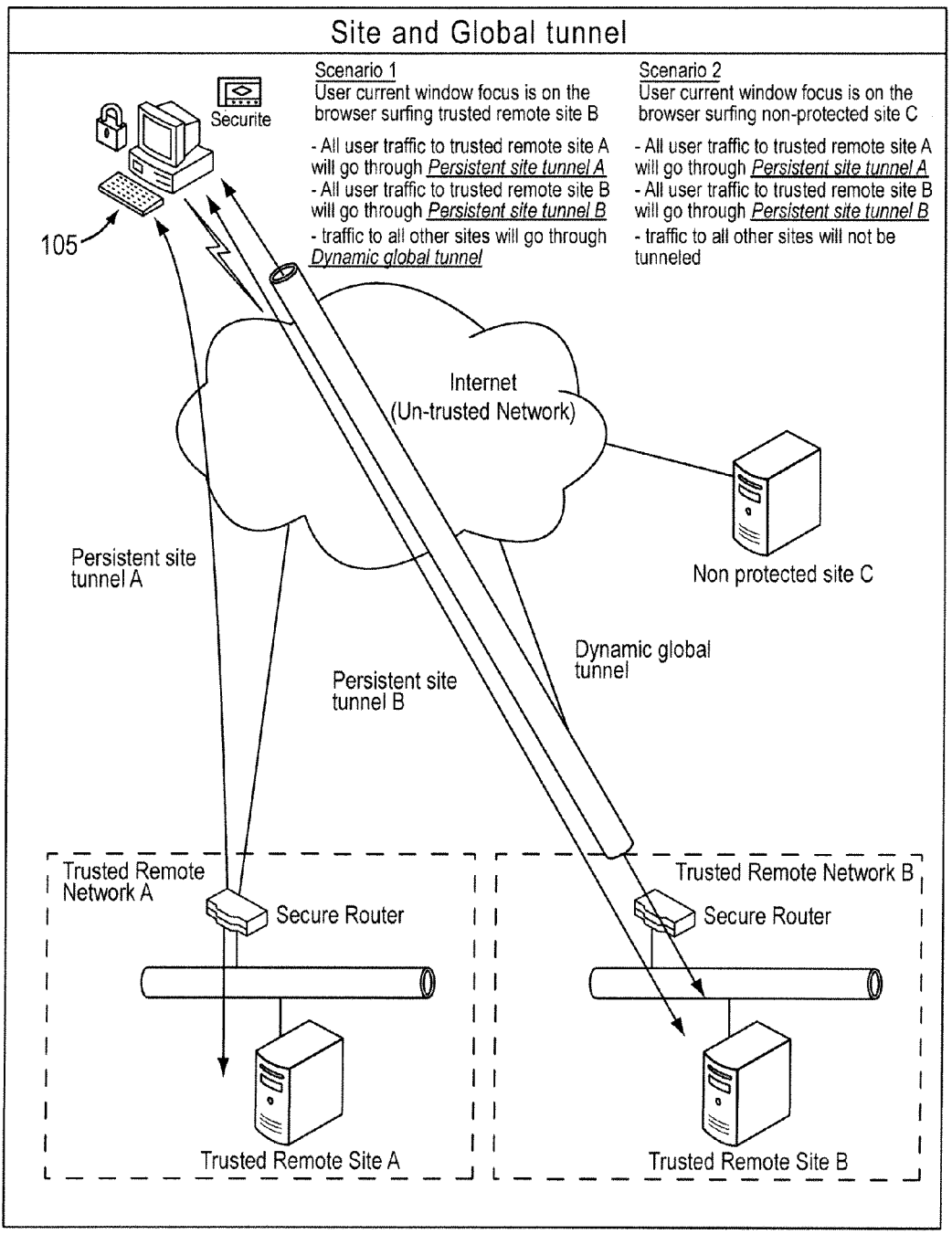
FIG. 4 is a block diagram illustrating a tunneling architecture, in accordance with an embodiment of the present invention.

FIG. 4 is a block diagram illustrating a tunneling architecture 400, in accordance with an embodiment of the present invention. The security engine 238 may achieve network access control by establishing a point-to-point anti-hijack tunnel to the remote private network of the protected website 125. By tunneling all network traffic through this tunnel during critical parts of a security session, the protected website 125 can inspect the traffic before accepting it or allowing it to pass, thus safeguarding sensitive user data from hackers and crimeware.

As shown in FIG. 4, end-user device 105 is coupled via a persistent site tunnel A to trusted remote site A, via a persistent site tunnel B to trusted remote site B, via a dynamic global tunnel to trusted remote site B, and to unprotected site C. In one embodiment, when window focus is on the window to remote site B, then all user traffic to remote site A goes through persistent site tunnel A, all user traffic to remote site B goes through persistent site tunnel B, and all other traffic to all other sites goes through the dynamic global tunnel. When window focus is on unprotected site C, then all user traffic to remote site A goes through persistent site tunnel A, all user traffic to remote site B goes through persistent site tunnel B, and all other traffic to all other sites is not tunneled. That way, the system is protected from data breach.

In some embodiments, the tunnel device 268 creates a persistent site-specific point-to-point tunnel to the remote site whenever a secure session to a whitelisted domain is established and creates a dynamic global tunnel for communications to all unprotected, remote sites when the session points to a whitelisted domain and the session is active. Thus, if the user switches between protected and unprotected sessions, sensitive data is always sent through the respective persistent anti-hijack site tunnel.

In one example, data to be transmitted to a remote site is received by the security component 135. The security component 135 determines if the remote site is whitelisted. If the remote site is whitelisted, then the security component 135 provides the data to the whitelisted remote site through the persistent site-specific point-to-point tunnel. If the remote site is unlisted (e.g., not on a whitelist or a blacklist), the security component 135 determines if the current active session is associated with a whitelisted remote site. If the current active session is associated with the whitelisted remote site, the data is transmitted through the dynamic global tunnel where it will likely be discarded. If the current active session is associated with an unlisted remote site (i.e., ah unprotected remote site), then the data is provided to the unlisted remote site without going through a tunnel.

In one example, the end-user device 105 establishes a first session with a trusted remote site and opens a persistent site-specific point-to-point tunnel to the trusted remote site. From this point forward until the first session is terminated, all data transmitted from the end-user device 105 to the trusted remote site will be sent through the persistent site-specific point-to-point tunnel. In addition, while the first session is active, all data to unprotected remote sites will be, sent through the dynamic global tunnel to the trusted remote site where the data may be discarded.

For example, a keylogger program, or other malware, may attempt to transmit sensitive data regarding communication between the end-user device 105 and the trusted remote site. While the first session is active, the data from the keylogger program will be transmitted through the dynamic global tunnel and may be discarded.

The end-user device 105 can also establish a second session with an unprotected remote site without terminating the first session. While the second session with the unprotected remote site is active; data may be transmitted to; the unprotected site without going through either the persistent site-specific point-to-point tunnel or the dynamic global tunnel.

Those skilled in the art will appreciate that when data is transmitted through the dynamic global tunnel, the data may not necessarily be discarded. In one example, the data is redirected by the trusted remote site to the unprotected remote site.

One-Way Tunnels

Figure 5:
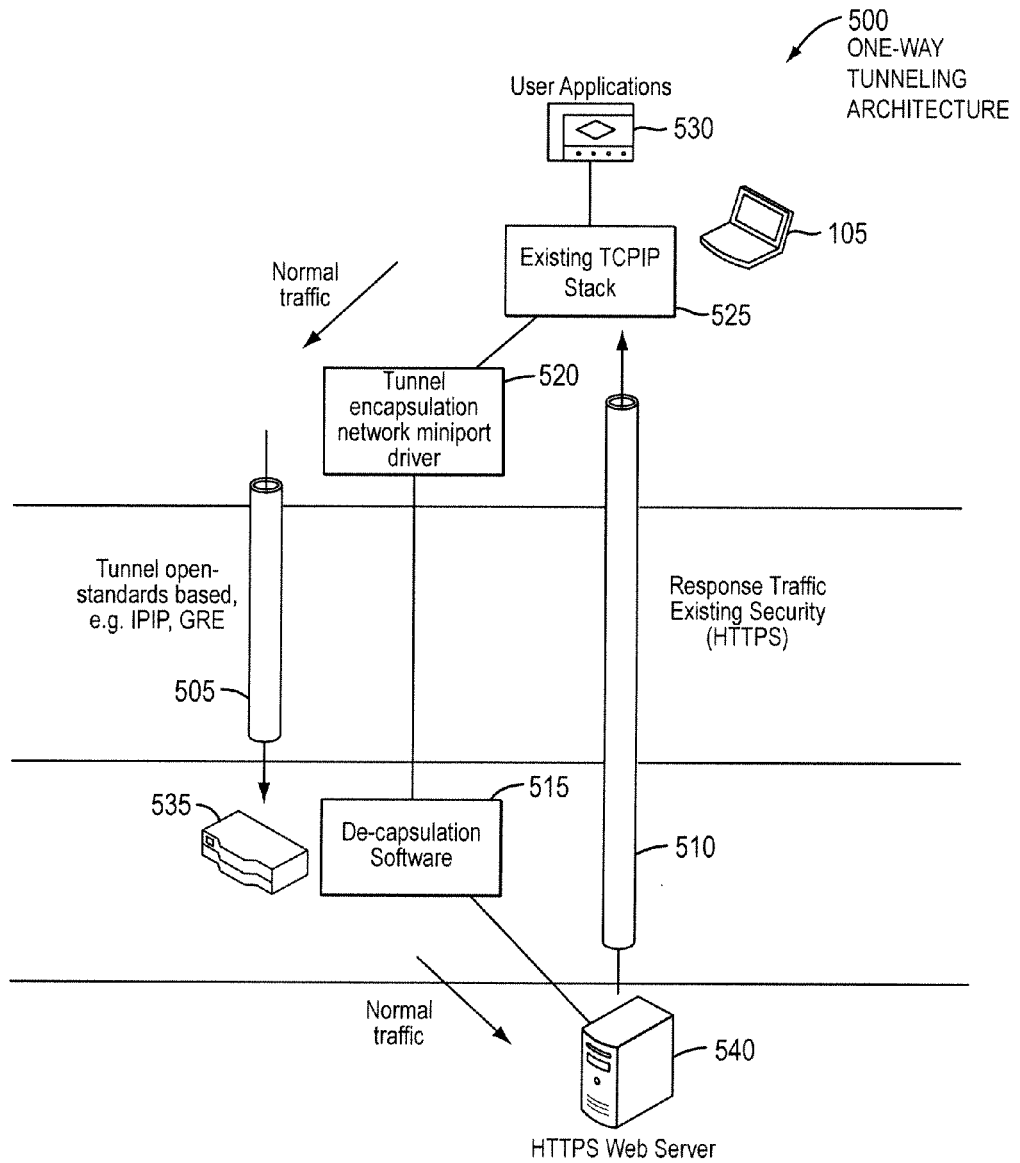
FIG. 5 is a block diagram illustrating a one-way tunneling architecture, in accordance with an embodiment of the present invention.

FIG. 5 is a block diagram illustrating a one-way tunneling architecture 500, in accordance with an embodiment of the present invention.

A traditional VPN includes a point-to-point tunnel to the remote data site (an anti-hijack mechanism), encryption for data over the network (an anti-data leakage mechanism), and decryption error for data modifications (a data integrity mechanism). All three components are concurrent and the load is the same regardless of feature requirements.

To be scalable and efficient, feature requirements can be decoupled and dependent on the data transmitted (i.e., data context sensitive). If all site-specific traffic is tunneled to the VPN, VPN access control can limit all or a subset of the end-user traffic. It is possible to manage end-user traffic (including the user local subnet traffic) by tunneling traffic to the VPN. However, for connection-orientated network protocols or to manage the outgoing data from the end-user device 105, it is not necessary to tunnel the reverse traffic for access control. The traffic from the end-user device 105 to the VPN is tunneled, while traffic from the VPN may be routed normally.

Effectively, there is no difference in the security of the end-user device 105, provided that the data over the network originated from the end-user device 105 to the VPN server regardless of whether the final destination server 110 is directly or not directly accessible via VPN. If the destination server is directly accessible without a VPN, then access control by the VPN is not possible without enforcing tunneling for traffic that needs to be controlled.

A single VPN session could include multiple network sessions (e.g., TCP or UDP) over a single tunnel with different data payload requiring different combinations Of data security and access controls. Various systems where concurrent combinations of various data security requirements over concurrent data streams over different networks (e.g., routed, NAT, transparent or manual proxy, etc.) in the forward and reverse directions can be supported using a concurrent combination of different techniques, versus a traditional VPN approach which enables all security features for all traffic concurrently. This is applicable in a VPN-like system for mass consumers.

As shown in FIG. 5, the architecture 500 for enabling one-way tunneling includes an end-user device 105 with a tunnel encapsulation network miniport driver 520, a decapsulation router 535, and an HTTPS server 540.

The access controls extend from the browser 130 of the end-user device 105 to the actual website 125 behind the decapsulation router 535. Besides network level protection, certain access and data integrity controls extend the protection from the browser 130 to the website 125.

Tunneling Behind a NAT

If the browser 130 is accessing the web server resources behind a NAT router, special processing may need to be done to allow the tunnel to work. For example, where no server software component is deployed on the server end, simple tunnel encapsulation may not work properly over a NAT network. The example below illustrates the problem:

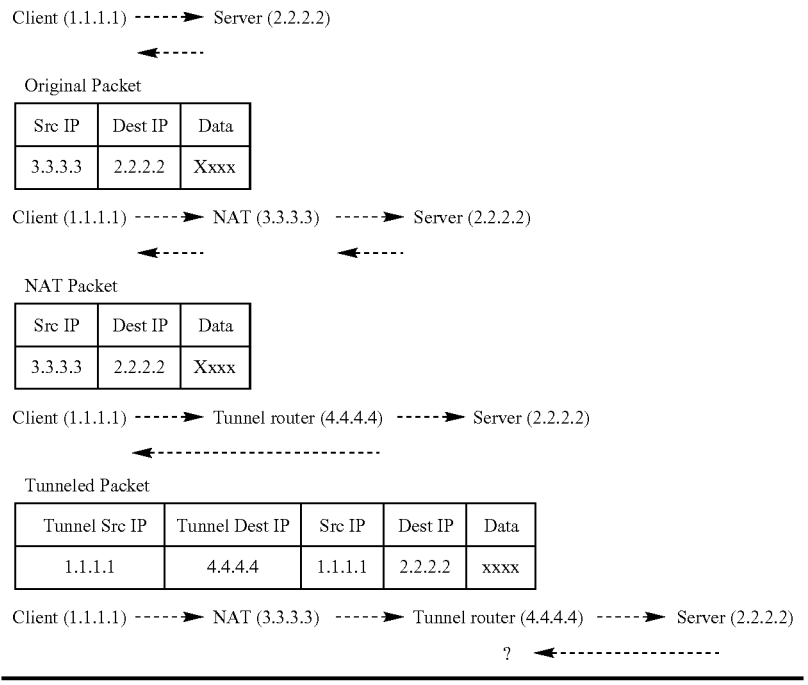

As illustrated, the tunneled traffic does not contain the NAT router's IP address, and thus the destination server may not be able to send the reply back to the NAT router and eventually to the end-user device 105.

To resolve this, one solution is to replace the original traffic source IP with the NAT routers WAN IP. This will allow the return traffic to be routed back to the NAT router and eventually back to the client.

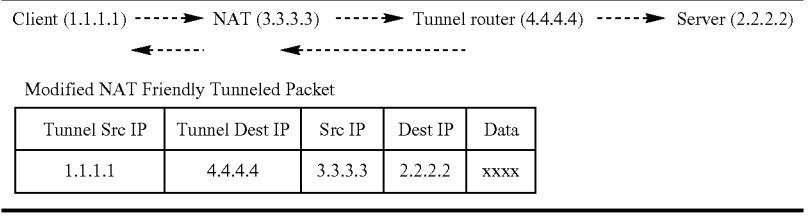

Other considerations for NAT support are:
1. NAT address and port mapping needs to be established properly. This mapping may not be setup properly when the traffic is send through the tunnel.
2. Stateful inspection for the proper and complete protocol handshake messages may result in resets for incomplete connections established through the tunnel.

To mitigate this, a possible solution is to send out the original protocol handshake packets without the tunnel so that the NAT mapping can be established properly, and that it has the least chance of triggering a connection reset.

Leaky Tunnels

Access controls by the decapsulation router 535 (or the router's backend infrastructure) can be compulsory or non-compulsory. If compulsory, a tunnel must be established in order to enable communication, even though there are situations when point-to-point tunnels do not work due (e.g., due to firewall blocking tunnel establishment or traffic; routers, gateways, NAT routers not supporting tunnel establishment or traffic; intervening proxy servers, etc.). If non-compulsory, then a leaky tunnel approach can be adopted. Essentially, the tunnel device 268 attempts to establish a point-to-point tunnel and send traffic through it. If the connection cannot be established or if the traffic cannot be sent through, then the tunnel device 268 turns off the tunnel and sends traffic without the tunnel.

A simple tunnel connectivity test at the application level may be insufficient or inaccurate to detect if a tunnel works, because many applications create multiple TCP connections to the server concurrently to speed up the download. The tunnel may work for the TCP connection that the connectivity test uses, but may not work for the other TCP connections that are used for downloading the data. This mismatch in tunnel connectivity test results can result in slow connections or timeouts for the user;

To enhance the detection mechanism, the tunnel device 268 tests connectivity at the TCP connection layer. That is, the tunnel device 268 conducts a tunnel connectivity test for each TCP Connection to determine if the tunnel works. If it does, the tunnel device 268 sends the traffic for that particular TCP connection through the tunnel. If not, the tunnel device 268 sends the traffic normally.

Figure 6:
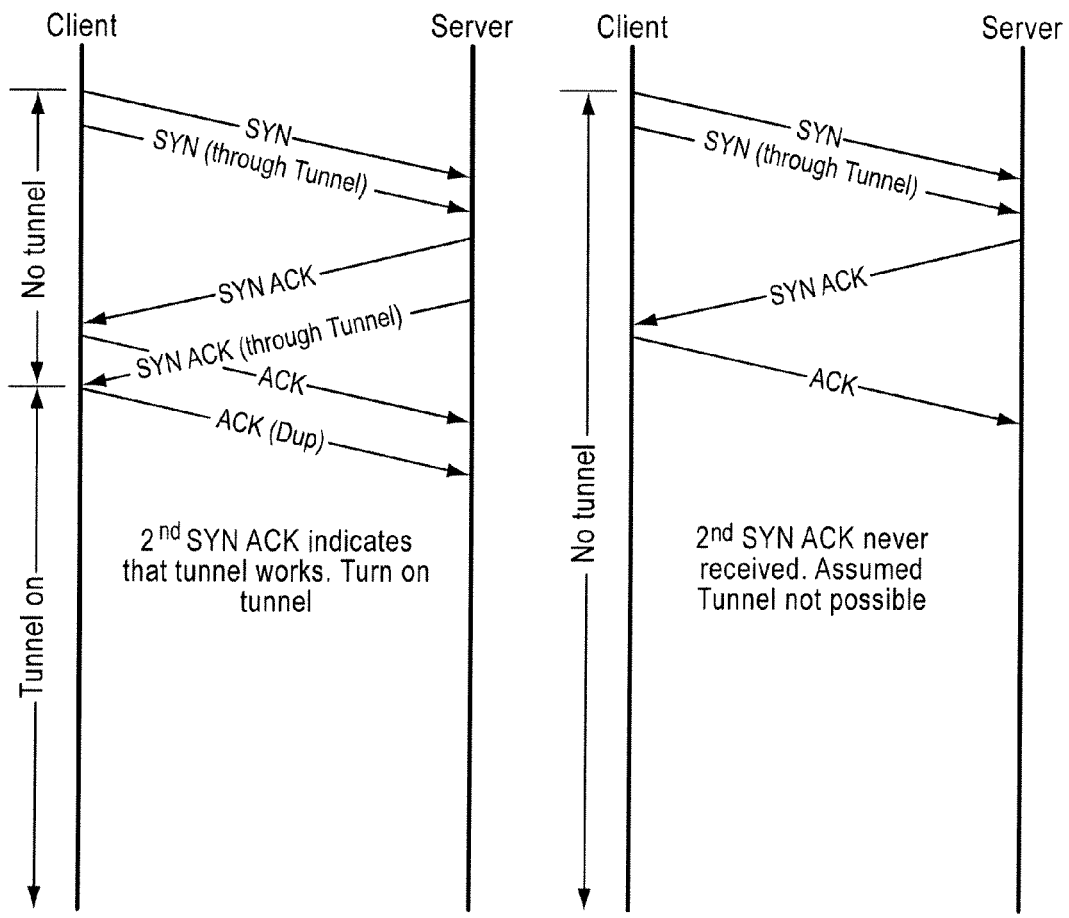
FIG. 6 is a timing diagram illustrating a simultaneous double synchronization method, in accordance with an embodiment of the present invention.
Figure 7:
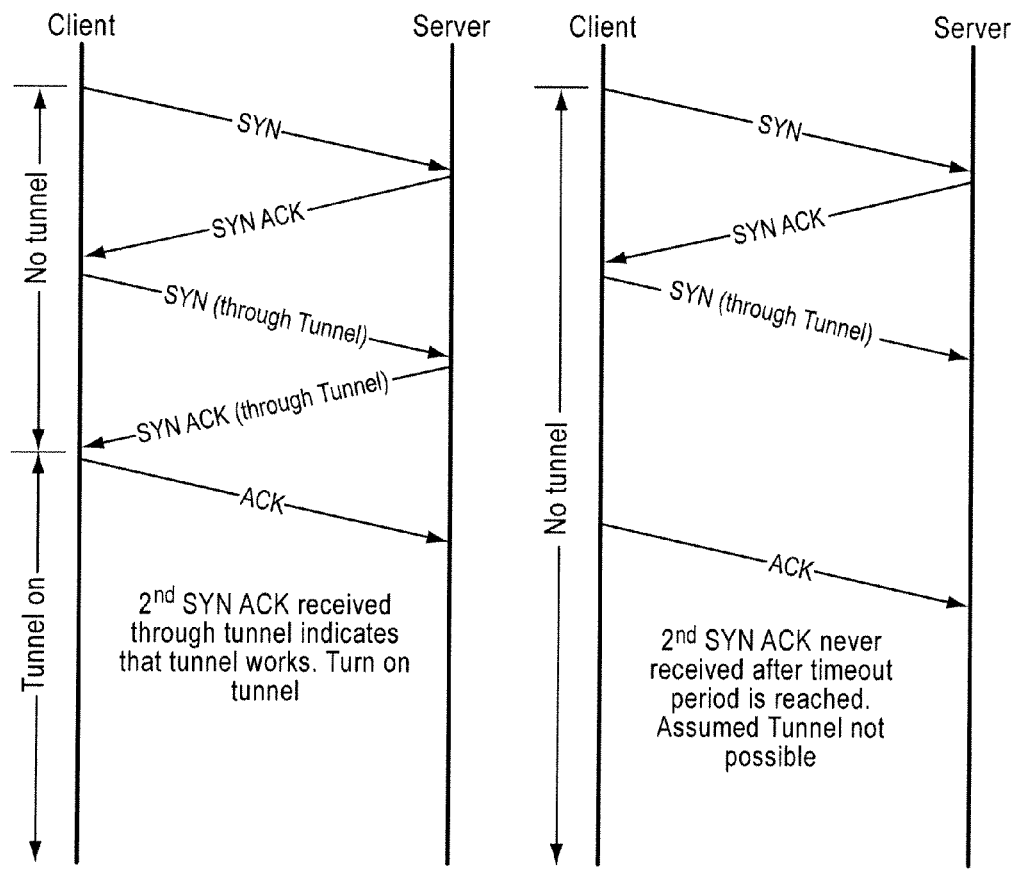
FIG. 7 is a timing diagram illustrating a sequential double synchronization method, in accordance with an embodiment of the present invention.

Two options to implement the TCP connectivity test include simultaneous double SYN method (FIG. 6) and sequential double SYN method (FIG. 7).

FIG. 6 is a timing diagram illustrating a simultaneous double synchronization method 600, in accordance with an embodiment of the present invention. For each TCP connection, the tunnel device 268 sends out two SYNs simultaneously. One is sent without the tunnel and another through the tunnel. If there are no network issues, the first SYN will reach the server, and will generate a SYN_ACK. The tunnel device 268 responds with an ACK to establish the connection. If the tunnel works, the 2nd SYN sent through the tunnel will also reach the server, and generate a SYN_ACK response. In response, the tunnel device 268 sends the 2nd ACK. When the 2nd SYN_ACK is received, the tunnel device 268 can be certain that the tunnel works. The tunnel device 268 can hook on either the 2nd SYN_ACK or the 2nd ACK packet to activate the tunnel for the rest of the data transmission. If the tunnel failed, the 2nd SYN_ACK or the 2nd ACK packet will never be received. Therefore the tunnel will not be activated.

FIG. 7 is a timing diagram illustrating a sequential double synchronization method, in accordance with an embodiment of the present invention. The tunnel device 268 send a SYN without a tunnel and awaits a SYN_ACK from the server. After receiving the first SYN_ACK but before passing the received SYN_ACK to the upper level protocol stack, the tunnel device 268 sends a 2nd SYN through the tunnel. If the tunnel works, the server receive the 2nd SYN and assumes that the first SYN_ACK was lost and resends its SYN_ACK. Upon receiving the 2nd SYN_ACK, the tunnel device 268 confirms that the tunnel works. The tunnel device 268 sends the ACK and starts sending data through the tunnel. If the tunnel does not work, then the 2nd SYN will never reach the server, which will not respond. After a timeout period after sending out the 2nd SYN, the tunnel device 268 will send the ACK and subsequent data without the tunnel.

Secure DNS

The traditional distributed DNS infrastructure assumes that all DNS servers are authentic and can be trusted. Accordingly, there is no validation of the authenticity of the DNS reply coming from the DNS servers.

The connection agent 234 of the security component 135 is capable of protecting the user from phishing or other forms of misdirection, including by augmenting existing DNS infrastructure. For whitelisted domains, the directory connector 248 sends all DNS requests to the directory service 140 to resolve the DNS securely. For unlisted domains, the website connector 250 passes the request to the original DNS infrastructure for resolution.

After resolving the DNS securely via the directory service 140, the DNS injector 258 injects the DNS entry into the calling applications. The DNS injector 258 may seamlessly integrate the DNS entry at the application layer or at a lower layer, e.g., the network layer. In one embodiment, the DNS injector 258 hooks onto the various APIs of the operating system that the different top level applications can call for resolving the network address at the application layer. The DNS injector inspects and injects the IP address of the whitelisted domain with the IP address securely resolved by the directory service 140, and returns it to the calling applications. Thus, the top level applications may not need modification.

If the DNS injector 258 cannot hook onto the APIs that the different applications can call to resolve DNS, the DNS injector 258 may inject the DNS entry at a lower level, e.g., at the network layer. At the network layer, the connection agent performs a secure DNS lookup via the directory service 140 and a normal DNS lookup for the same domain. If the resolved IP addresses are different, the connection agent 234 creates a rule that instructs the network driver to perform a Destination Network Address Translation (DNAT) from the normal DNS resolved IP, e.g., IP1, to the security directory 140 resolved IP, e.g., IP2. The connection agent 234 maps the return the source IP address of return data packets from IP2 to IP1 to enable upper layer protocol and applications to process the return data properly.

Figure 8:
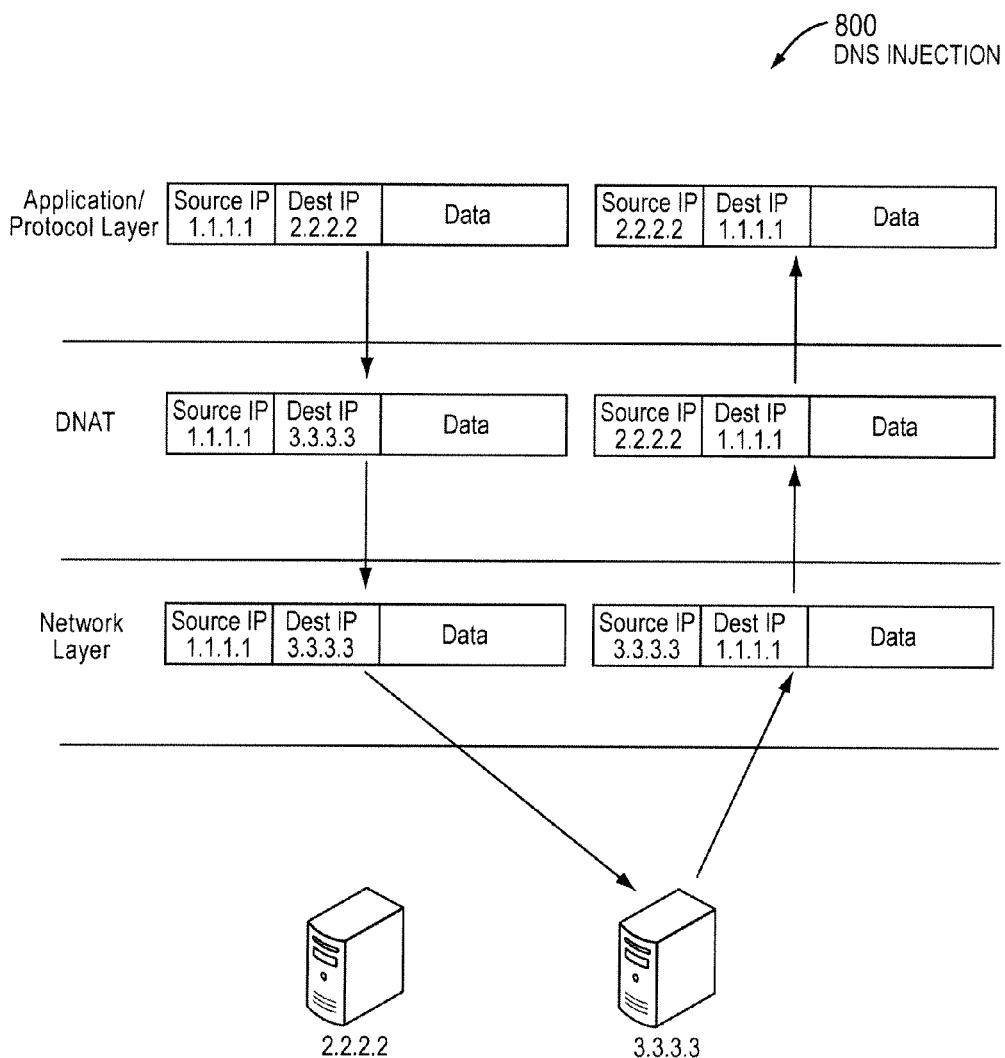
FIG. 8 is a block diagram illustrating DNS address injection, in accordance with an embodiment of the present invention.

FIG. 8 is a block diagram illustrating DNS address injection 800, in accordance with an embodiment of the present invention. The application requests for resolution of the whitelisted domain, e.g., www.yahoo.com. Normal DNS resolves the IP to 2.2.2.2, while the directory service 140 resolves the domain name to 3.3.3.3. The connection agent 234 translates destination IP 2.2.2.2 of outgoing packets from the application to destination IP 3.3.3.3 before sending it to IP 3.3.3.3. The connection agent 234 receives the incoming packet with source IP 3.3.3.3, and translates source IP 3.3.3.3 to source IP 2.2.2.2 before passing it to the application.

Local PC Security Data Caching

The cache engine 260 supports local caching of DNS entries to reduce the secure DNS and website resolution overhead time as well as the amount of generated network traffic.

As the nature of the DNS entries are different, different caching period may be adopted for different type of DNS entries, Three example types of DNS entries are whitelisted domain entries, blacklisted domain and URL entries, and non-protected domain entries. Whitelisted domains entries may contain the website and router IP address and typically do not change frequently. Therefore, the refresh period for these entries can be longer, e.g., 3-5 days. Blacklisted domains and URLs typically last only for a short period of time before they are detected and brought down. Such entries should be refreshed on a more regular basis, say every 5-8 hours. Unlisted domains not protected by the security component 135 and not blacklisted domains, the cache refresh period should be very short, because some may become blacklisted domains and heed to be propagated to the clients quickly. Refresh time for such entries may be around 1 hour.

For updating the cache entries, the security component updater 226 may apply a client bulk query pull or a client single query pull technique. Upon system boot-up, on a regular interval, upon request, after predetermined events, etc., the component updater 270 initiates a bulk query to refresh all expired entries in the cache. In one embodiment, the component updater 270 conducts individual application queries. When the security component 135 detects that the domain being requested is not in the cache or has expired, the security component can query the directory service 140 for the information and cache it accordingly.

To help speed up updates and broadcasting of newly detected blacklisted domains, such information can be piggybacked in the reply to the client single query request. If the new blacklisted domain entry is found in cache, has not expired, and/or deemed not updated, the security component 135 will mark it as expired. In this manner, when the security component 135 requests the blacklisted domain entry, the security component 135 will initiate a new single query and the directory service 140 will make the blacklisted information immediately available.

In one embodiment, the size of the cache 262 may be around 400-500 entries. It may be designed big enough to contain at least 80% of all the unique domains a user visits and not so big to make querying and updating slow. It may include the 400-500 last recently used entries.

For security and privacy reasons, there may be a need to host the directory service 140 on the website's infrastructure. To achieve this, a simple name forwarding mechanism can be used. When the security component 135 requests secure resolution of a domain, the directory service 140 responds with a directory service (DS) Forward Reply message which contains the website's DS address. Upon receiving this message, the security component 135 queries the website-hosted directory service 140 and stores the resolved domain name and the associate directory service 140 information in the cache 262. All subsequent queries and updates for these special domain entries are then resolved using the hosted directory service 140 directly. In this way, the websites have more control of their own infrastructure, which allows them to update and change their information faster.

This technique method does not add overhead to the end user, except for the first query which the security component 135 forwards to the customer-hosted directory service 140.

During the client bulk query refresh, the security component 135 can check if there are any changes to the hosted directory service 140 location or if any rights have been revoked.

Figure 9:
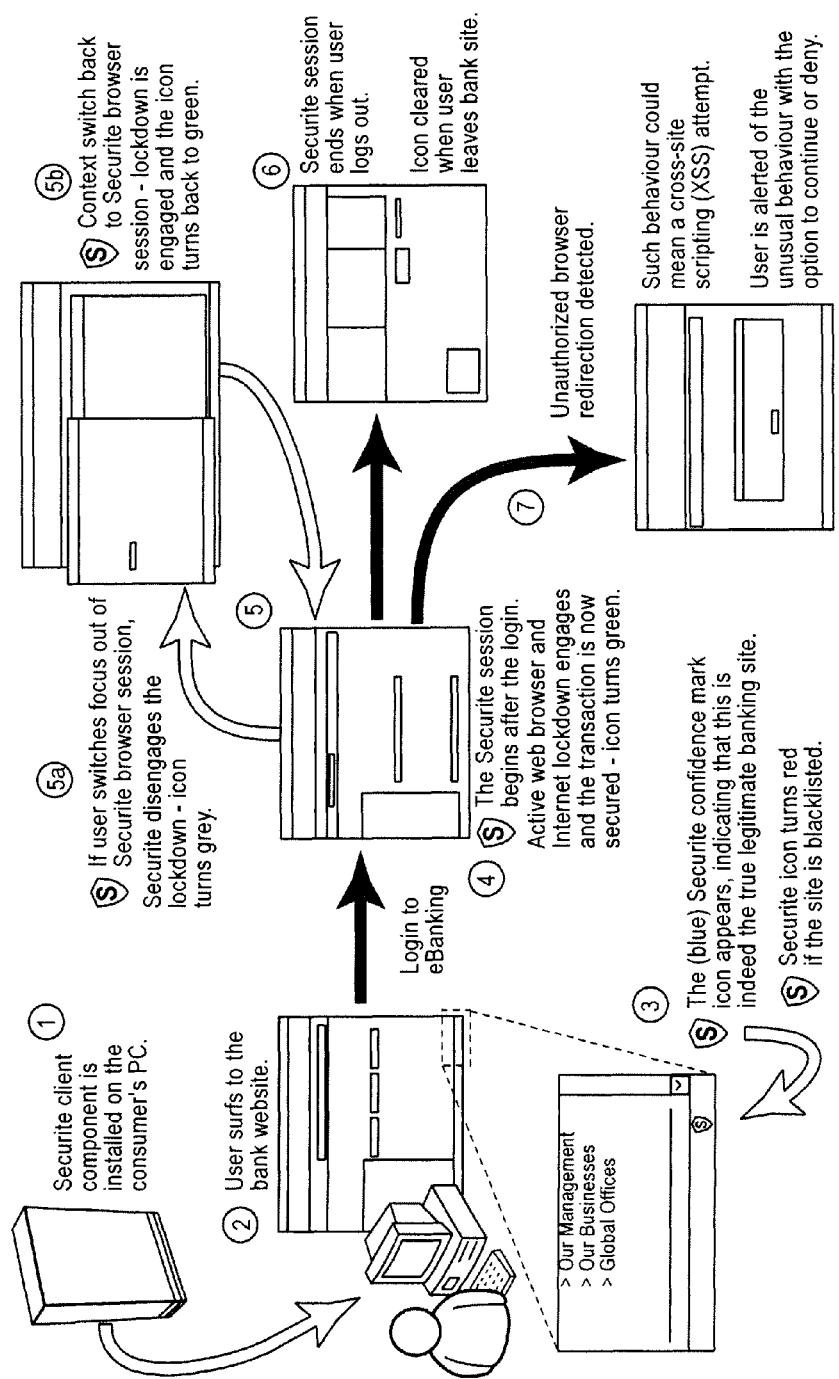
FIG. 9 is a block diagram illustrating an example protected transaction, in accordance with an embodiment of the present invention.

FIG. 9 is a block diagram illustrating an example protected transaction 900, in accordance with an embodiment of the present invention. Transaction 900 begins with the security component 135 in step 1 being installed on the end-user device 105. The end user in step 2 surfs to a protected website 125, e.g., a bank website. The security component 135 presents a status indicator on the browser frame to indicate whether security is enabled. In one embodiment, the status indicator turns blue to indicate that the website is protected. The status indicator turns red if the website were blacklisted. The security component 135 in step 4 obtains the security policy 150 and initiates the security engine 238 after the end user logs into the website 125 and while the browser window is active. Internet lockdown engages. In one embodiment, the status indicator turns green to indicate that the website session is secure. If the user in step 5a switches to another window, then the security engine 238 disengages lockdown. In one embodiment, the security engine 238 turns the status indicator grey. If the end user in step 5b switches back to the protected website 125, then the security engine 238 re-initiates lockdown and turns the status indicator back to green. If during the secure session, the end user in step 7 tries to follow a hyperlink or other URL to a blacklisted site, e.g., a known phishing site, then the security engine 238 recognizes the cross-site scripting attempt and alerts the user, possibly requesting instructions whether to proceed. When the end user logs out, the security engine 238 in step 6 disconnects lockdown and the status indicator is cleared.

Figure 10:
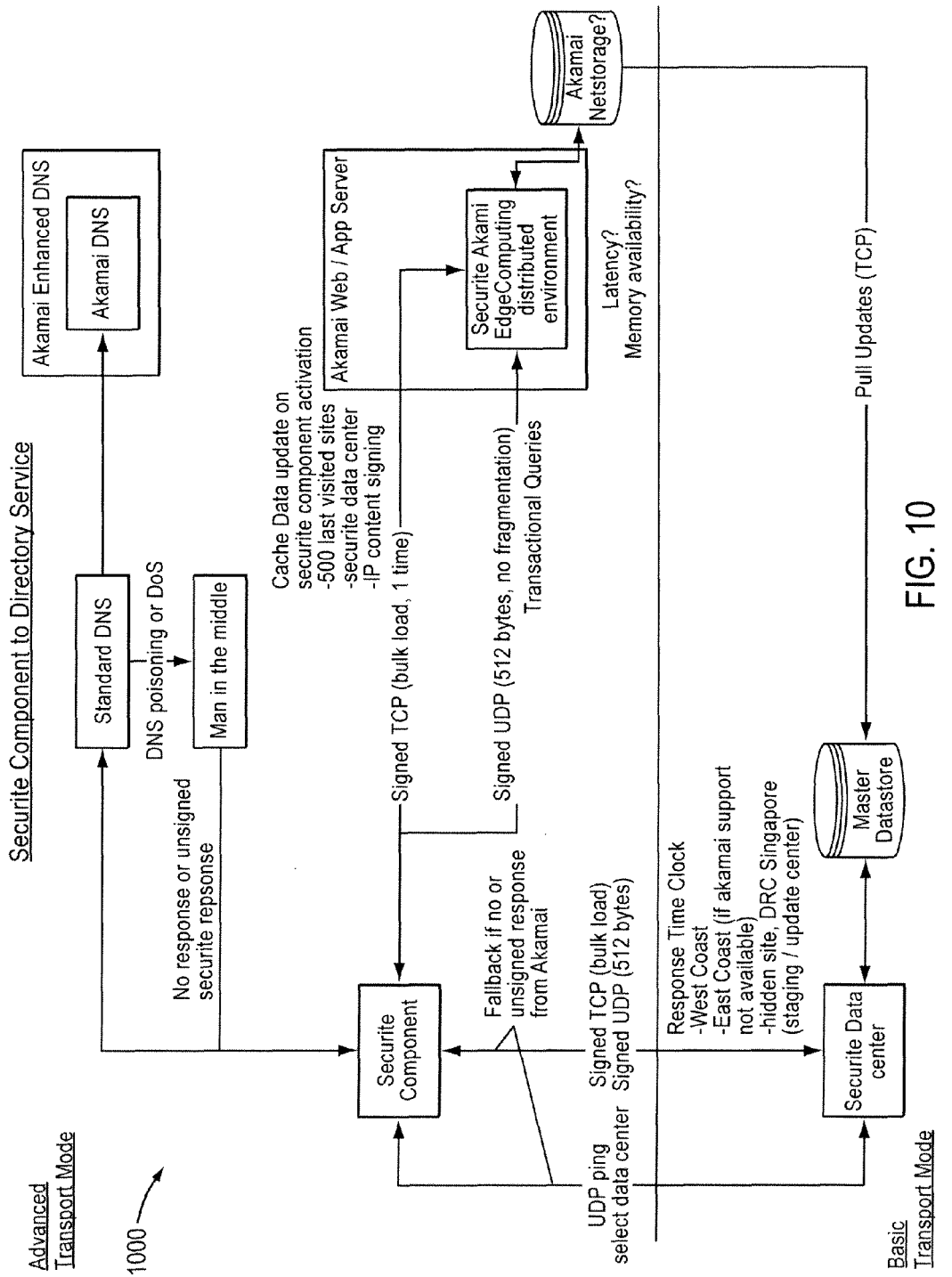
FIG. 10 is a block diagram illustrating DNS security architecture, in accordance with an embodiment of the present invention.

FIG. 10 is a block diagram illustrating DNS security architecture 1000, in accordance with an embodiment of the present invention.

Figure 11A:
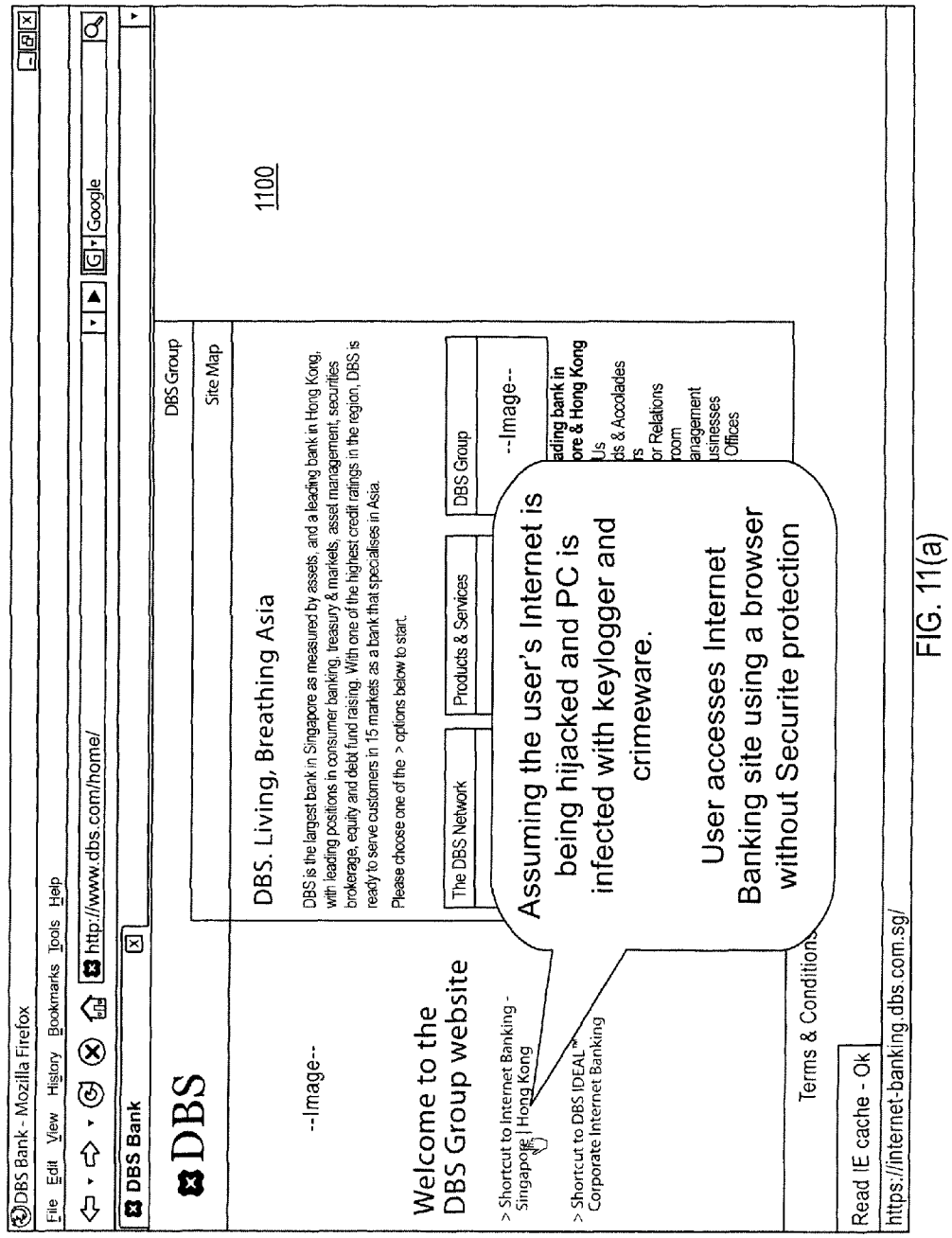
FIGS. 11(a)-11(e) are screenshots illustrating an example prior art unprotected session.
Figure 11B:
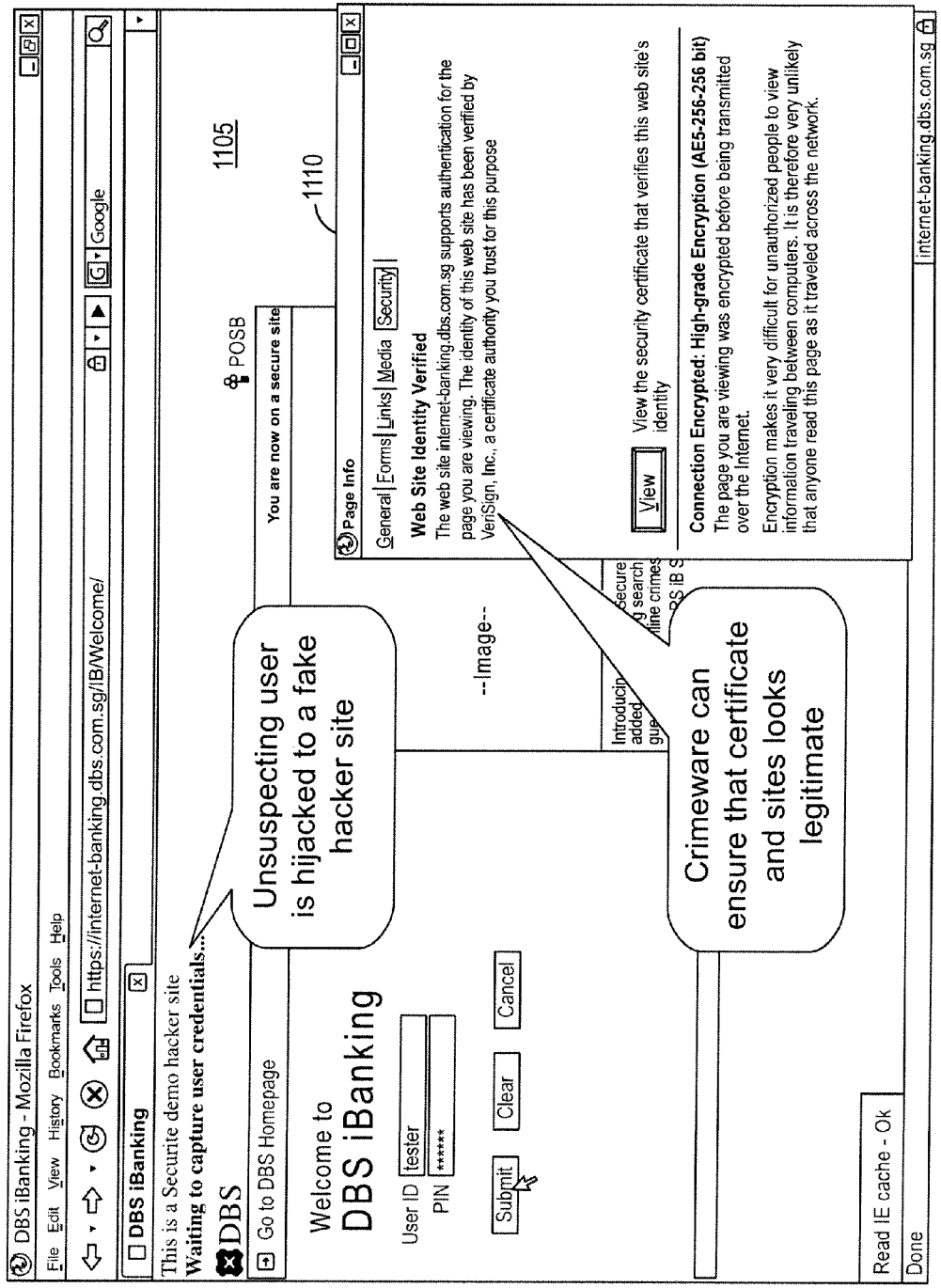
Figure 11C:
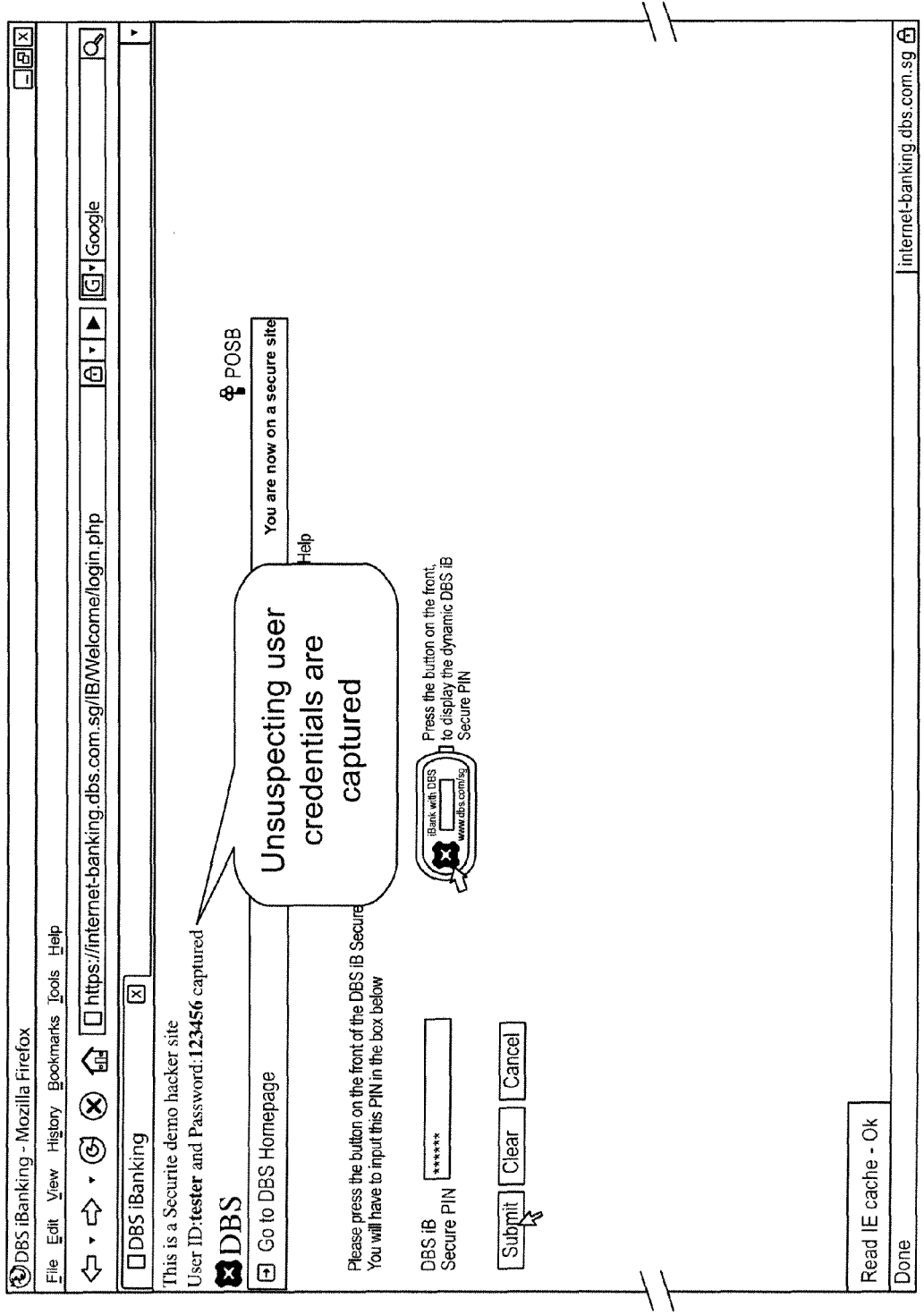
Figure 11D:
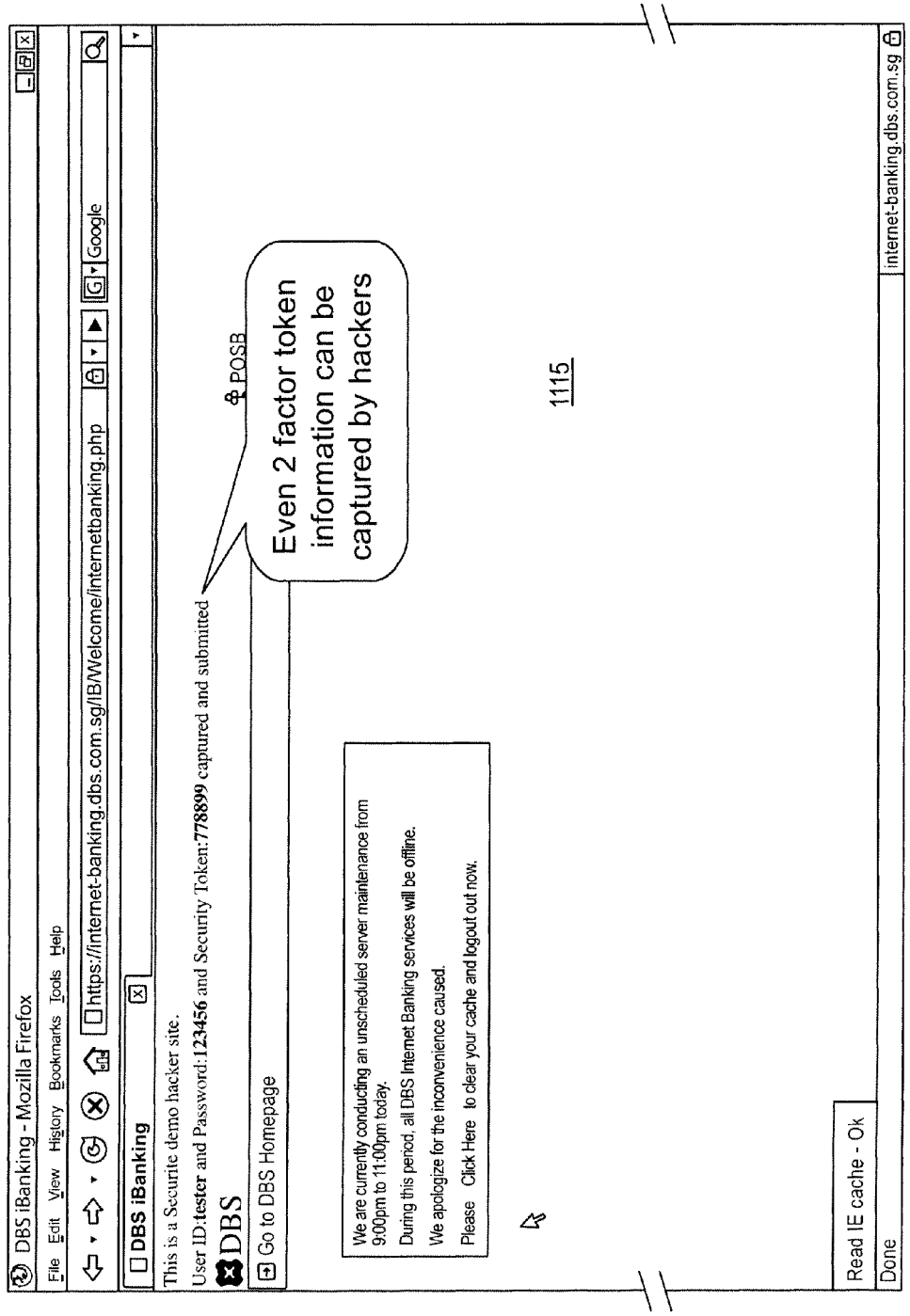
Figure 11E:
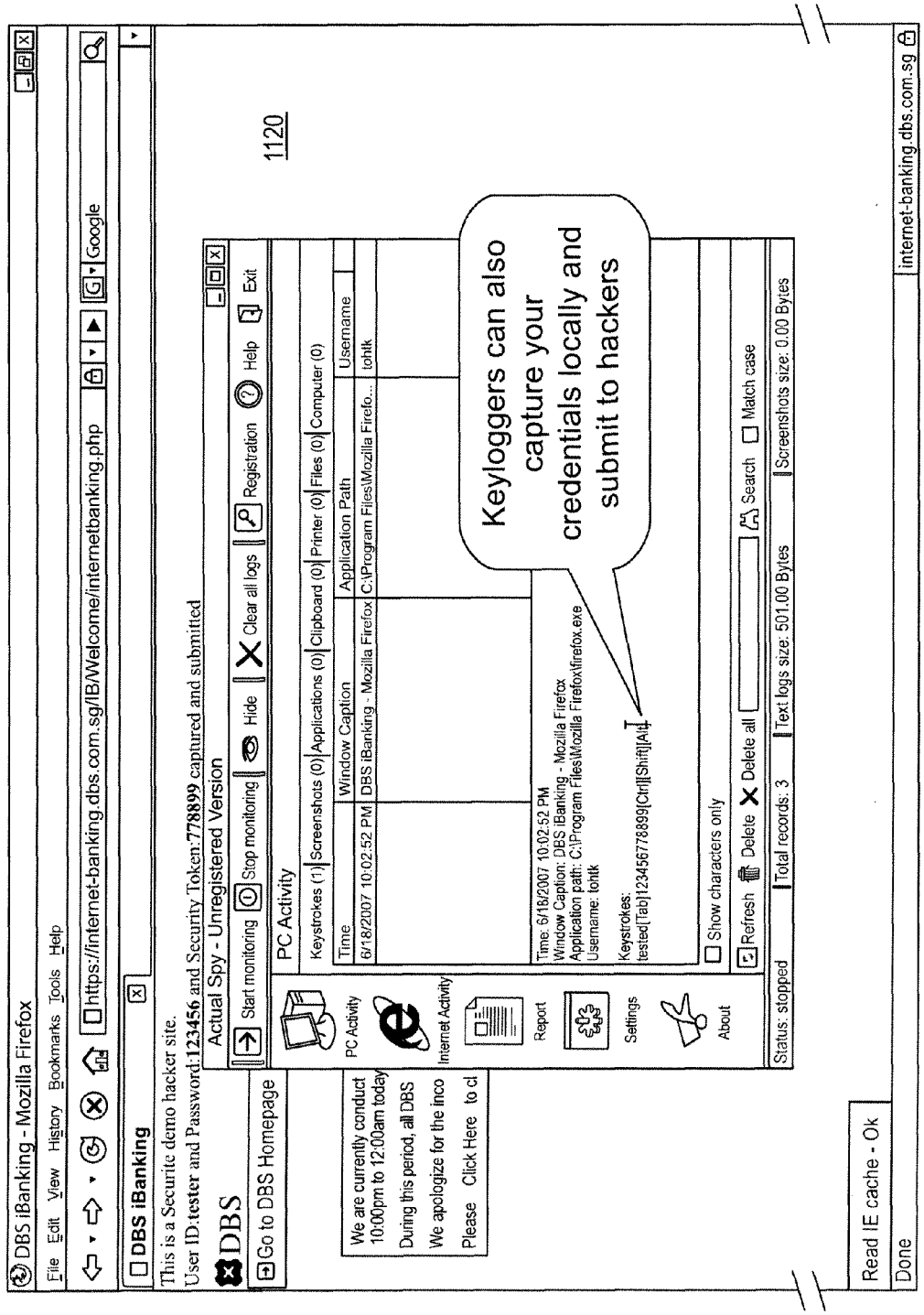

FIGS. 11(a)-11(e) are screenshots illustrating an example prior art unprotected session. FIG. 11(a) shows an unprotected website 1100. The user's Internet 120 has been hijacked and end-user device 105 is infected with a keylogger and crimeware. The end-user accesses the Internet banking web page using a browser without the security component 135. FIG. 11(b) shows an Internet banking web page 1105, which unknown to the user is a fake hacker site. The crimeware makes the digital certificate 1110 look authentic. FIG. 11(c) shows a screen where the user's ID and password have been entered, and unsuspectingly captured. FIG. 11(d) shows a server-down page to fool the user into thinking the real banking site is currently under maintenance. FIG. 11(e) shows the store where the data captured by the keylogger and is ready for transfer to the hacker.

Figure 12A:
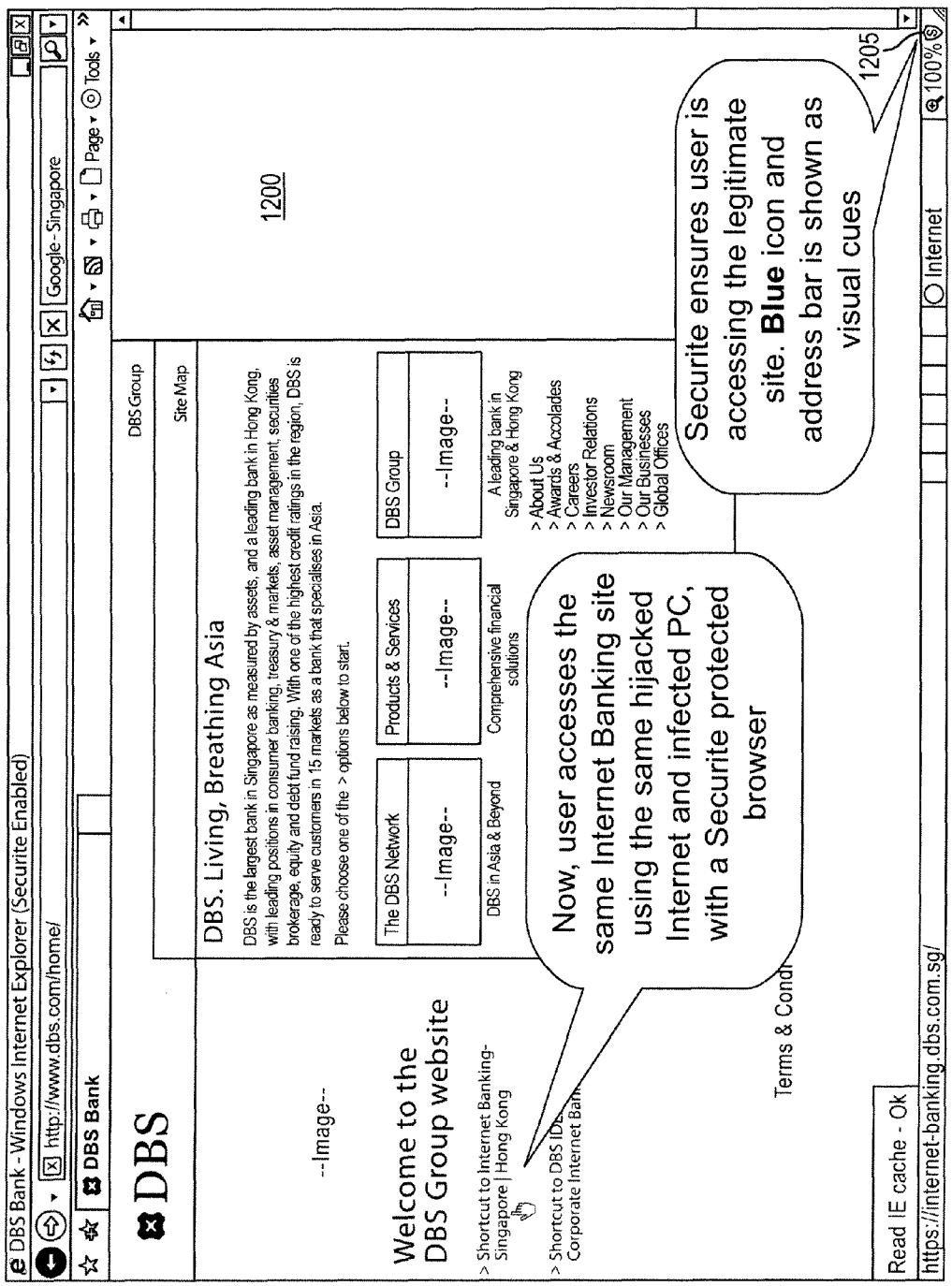
FIG. 12(a)-12(f) are screenshots illustrating an example protected session, in accordance with an embodiment of the present invention.
Figure 12B:
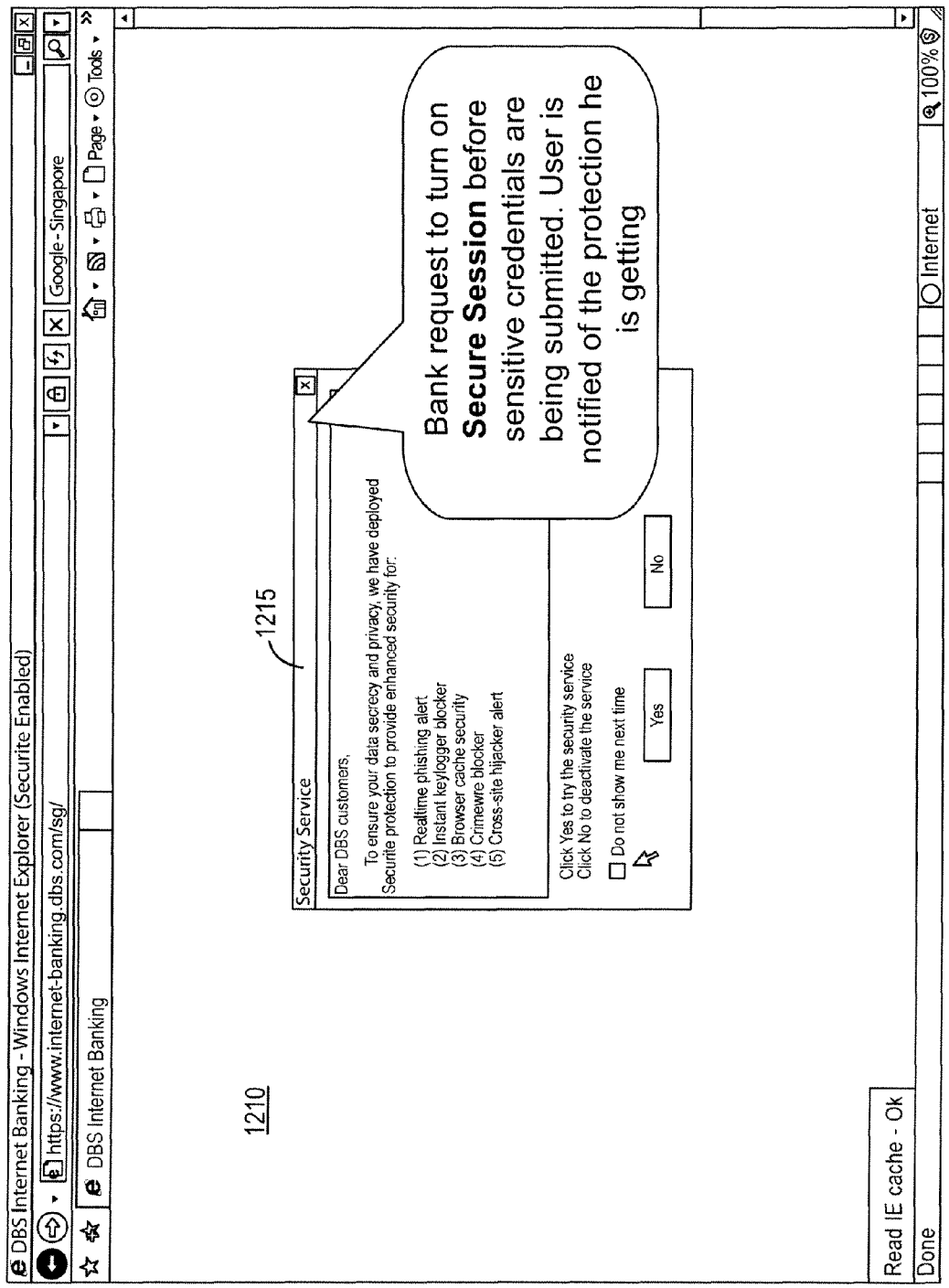
Figure 12C:
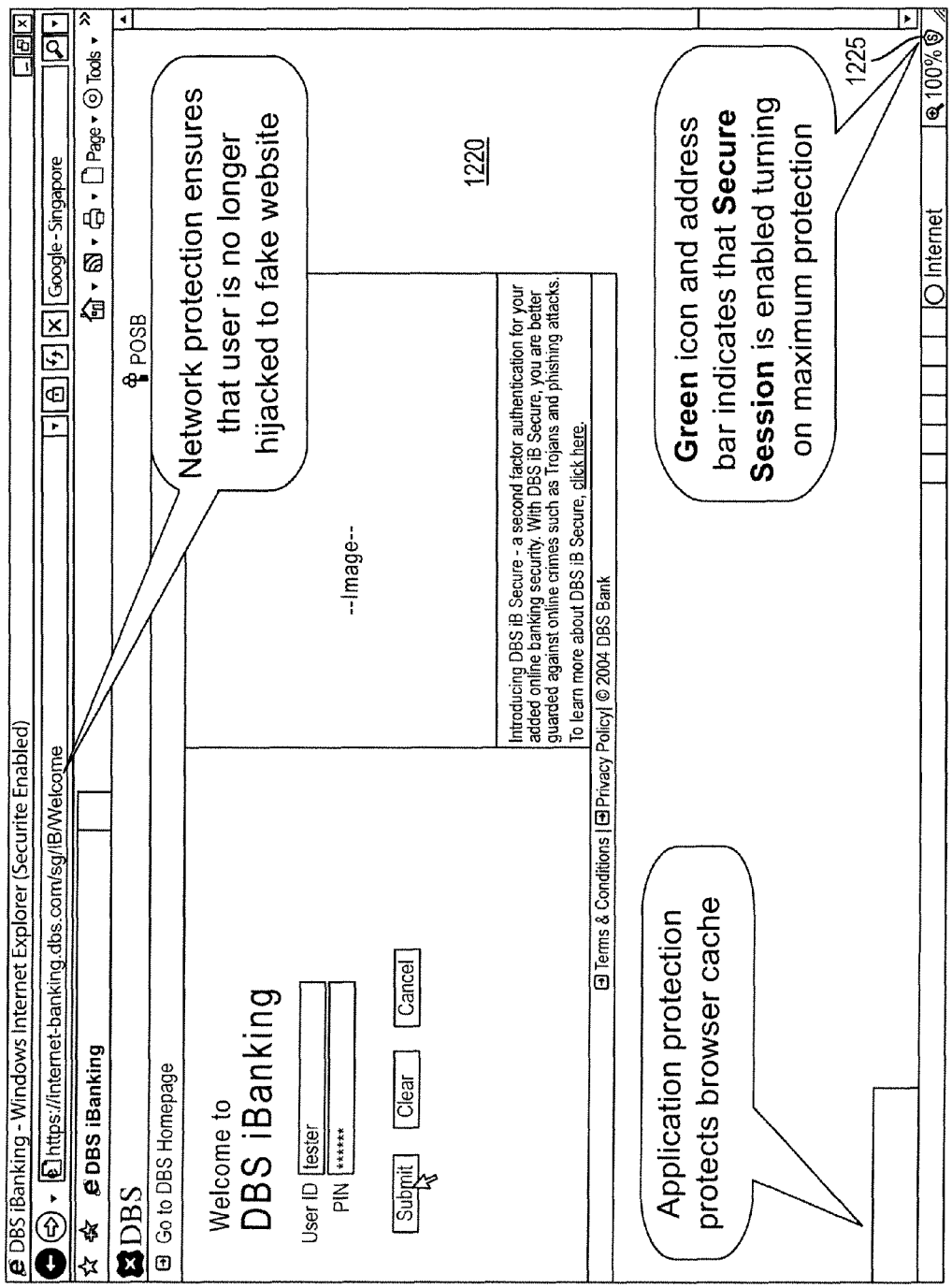
Figure 12D:
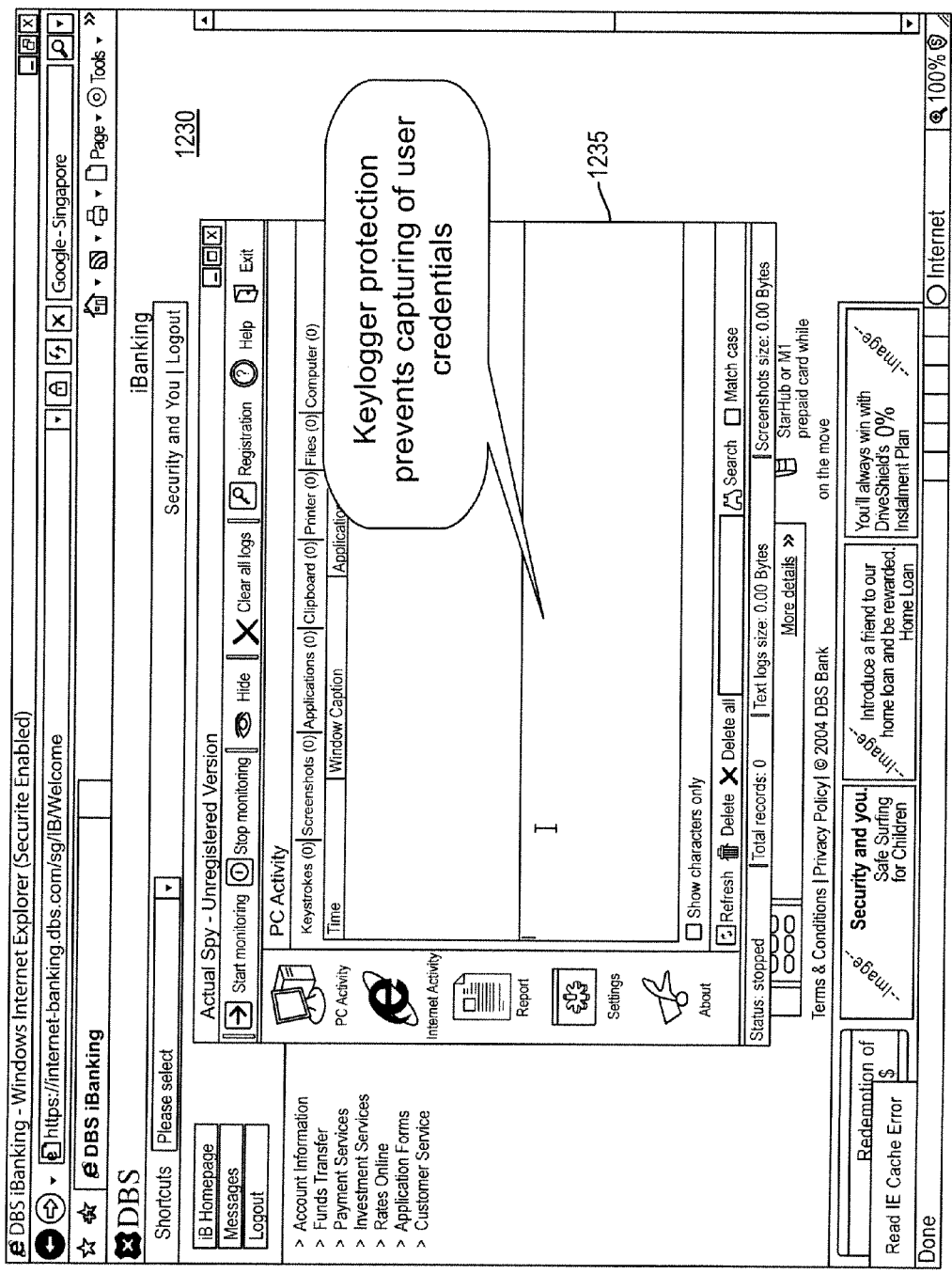
Figure 12E:
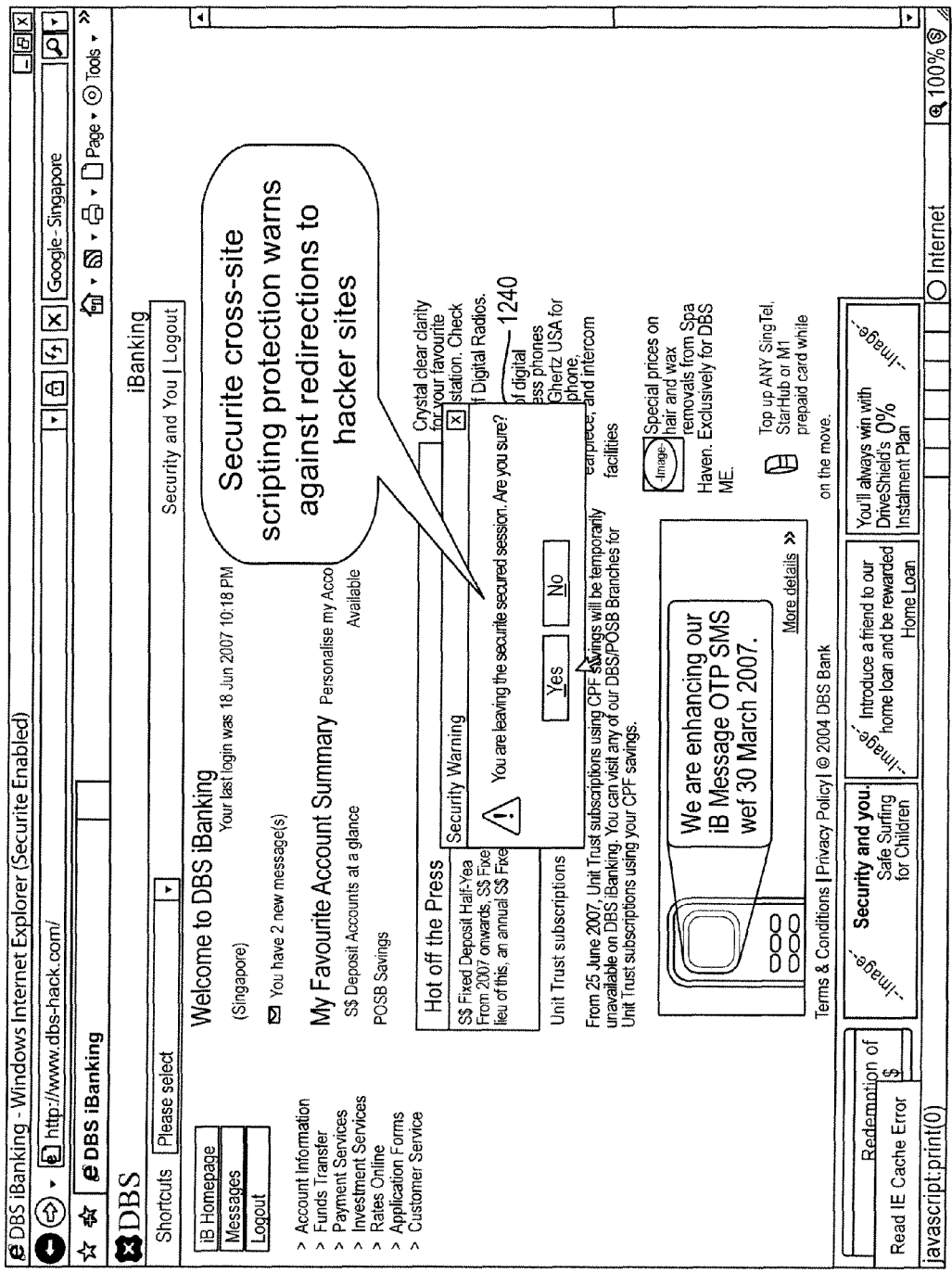
Figure 12F:
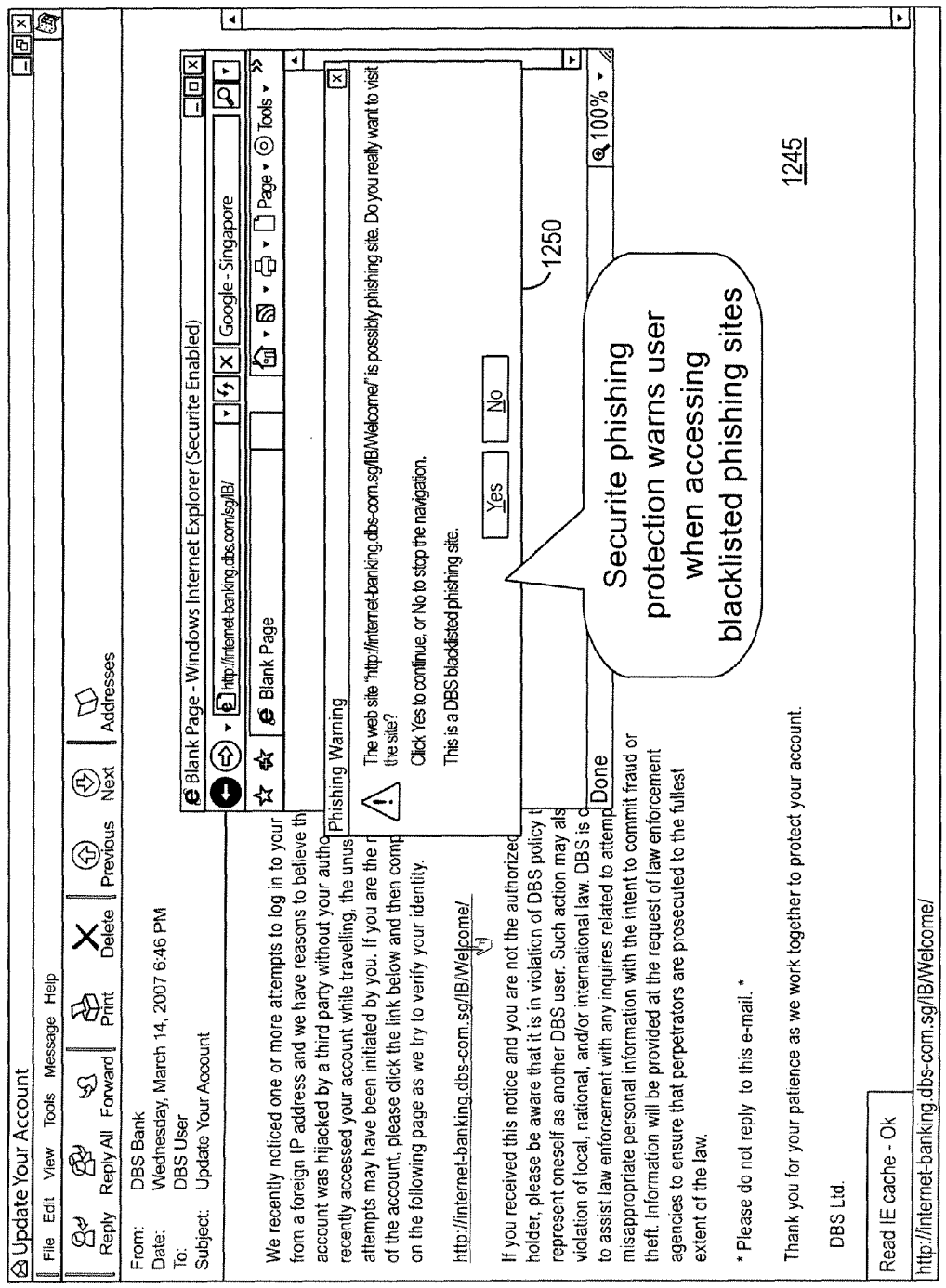

FIG. 12(a)-12(f) are screenshots illustrating an example protected session, in accordance with an embodiment of the present invention. FIG. 12(a) shows a protected website 1200, e.g., the same website 1100 protected with a security policy 150. With keylogger and crimeware infections and a hijacked internet connection, the end-user accesses the Internet banking web page, this time using a browser with the security component 135. The security component 135 presents a blue icon 1205 to indicate that the website 125 is whitelisted. FIG. 12(b) shows a pop-up request 1215 for authorization to deploy a secure session with the end-user device 105. FIG. 12(c) shows the true Internet banking web page 1220, reached by the end-user because of proper DNS checking, with the user's ID and password being entered into the proper fields. The web page 1220 shows a green icon 1225 since the site is both whitelisted and a secure session is active. FIG. 12(d) shows the banking web page 1230 and the store 1235 with no data captured by the keylogger, since the security component 135 unhooked any otherwise active keyloggers. FIG. 12(e) shows a pop-up window 1240 to inform the user that a hyperlink request is redirecting the browser 130 outside the secure session, and request informed approval. FIG. 12(f) shows the blacklisted web page 1245 to which the user has navigated, e.g., after hitting "Yes" on the previous screen 1240. The security component 135 presents a pop-up window 1250 to inform the user that the hyperlink about to be selected is going to connect the browser 130 to a blacklisted site, e.g., a possible phishing site.

In various embodiments, an end-user device comprises a tunnel device. The tunnel device may be configured to provide a first offer for a secure connection to a web server, to provide a second offer for a non-secure connection to the same web server, to receive at least one response from the web server, and to establish a communication connection with the web server based on the at least one response. The system may further comprise a decapsulation router wherein access controls of the decapsulation router are non-compulsory.

With respect to the system above, the communication connection may include a tunnel. Further, the first offer for the secure connection may be provided through a tunnel. Moreover, the response may include a first response to the first offer for the secure connection and a second response to the second offer for the non-secure connection and the communication connection may include a tunnel based on the first response from the first offer for the secure connection.

In some embodiments, the first offer for the secure connection and the second offer for the non-secure connection are SYNs and the response may be a SYN-ACK. The first offer for the secure connection and the second offer for the non-secure connection may be provided to the web server nearly simultaneously. Alternately, the second offer for the non-secure connection may be provided after a time out period that initiated with the second offer for the secure connection.

Further, the first offer for the secure connection may comprise a test of connectivity at a TCP connection layer. The tunnel device may be further configured to test connectivity at a TCP connection layer for each TCP connection.

A method for performing various embodiments comprises providing a first offer for a secure connection to a web server, providing a second offer for a non-secure connection to the web server, receiving at least one response from the web server, and establishing a communication connection with the web server based on the at least one response.

With respect to the method above, the communication connection may include a tunnel. Further, providing the first offer for the secure connection may include providing the first offer for the secure connection through a tunnel. Moreover, the response may includes a first response to the first offer for the secure connection and a second response to the second offer for the non-secure connection and the communication connection may include a runnel based on the first response from the first offer for the secure connection.

In some embodiments, the first offer for the secure connection and the second offer for the non-secure connection are SYNs and the response may be a SYN-ACK. Providing the first offer for the secure connection and providing the second offer for the non-secure connection may be provided to the web server nearly simultaneously. Alternately, the second offer for the non-secure connection may be provided after a time out period that initiated with the second offer for the secure connection.

Further, providing the first offer for the secure connection may comprise testing of connectivity at a TCP connection layer. Testing connectivity at a TCP connection layer for each TCP connection may include providing the first offer for the secure connection.

In various embodiments, a system may comprise a means for providing a first offer for a secure connection and a second offer for a non-secure connection to a web server, a means for receiving at least one response from the web server, and a means for establishing a communication connection with the web server based on the at least one response.

In some embodiments, the end-user device comprises a directory connector, a website connector, a security engine, and a DNS injector. The directory connector may be configured to perform a secure DNS lookup for a domain with a directory service to receive a secure IP address. The website connector may be configured to perform a normal DNS lookup for the domain with a DNS server to receive a DNS resolved IP address. The security engine may be configured to compare the secure IP address to the DNS resolved IP address. The DNS injector may be configured to perform a destination network address translation from the DNS resolved IP address to the secure IP address based on the comparison and map the source IP address of return packets from the secure IP address to the DNS resolved IP address based on the comparison. The end-user device may further comprise an authenticator configured to check a https certificate to confirm that the domain is authentic.

With respect to the system claim above, the comparison may indicate that the secure IP address and the DNS resolved IP address are not similar. The end-user device may further comprise a cache engine configured to update a cache with whitelisted and/or blacklisted domains from the directory service. The directory connector may be further configured to determine if a domain name for the domain is associated with a whitelist. The whitelist may be within a cache on the end-user device or available through the directory service.

Further, the directory connector may be further configured to determine if an API of an operating system of the end-user device may be altered to receive the secure IP address. In some embodiments, the directory connector may be further configured to determine that a second domain is hot associated with a whitelist and a blacklist and the website connector may be further configured to perform a second normal DNS lookup for the second domain with the DNS server to receive a second DNS resolved IP address.

A method for performing various embodiments may comprise performing a secure DNS lookup for a domain with a directory service to receive a secure IP address, performing a normal DNS lookup for the domain with a DNS server to receive a DNS resolved IP address, comparing the secure IP address to the DNS resolved IP address, performing a destination network address translation from the DNS resolved IP address to the secure IP address based on the comparison, and mapping the source IP address of return packets from the secure IP address to the DNS resolved IP address based on the comparison.

With respect to the method above, the method may further comprise determining if a domain name for the domain is associated with a whitelist. The whitelist may be resident on an end-user device or through the directory service. Further, the method may further comprise updating a cache with whitelisted domains and/or blacklisted domains from the directory service.

Moreover, the method may further comprise determining if an API of an operating system of an end-user device may be altered to receive the secure IP address. The method may also further comprise determining that a second domain is not associated with a whitelist and a blacklist and performing a second normal DNS lookup for the second domain with the DNS server to receive a second DNS resolved IP address.

In various embodiments, a computer readable medium may have embodied thereon executable instructions, the executable instructions may be executable by a processor for performing a method, the method may comprise performing a secure DNS lookup for a domain with a directory service to receive a secure IP address, performing a normal DNS lookup for the domain with a DNS server to receive a DNS resolved IP address, comparing the Secure IP address to the DNS resolved IP address, performing a destination network address translation from the DNS resolved IP address to the secure IP address based on the comparison, and mapping the source IP address of return packets from the secure IP address to the DNS resolved IP address based on the comparison.

In various embodiment, an end-user device may comprise a browser, a browser context monitor, and a tunnel device. The browser may be configured to establish a first session with a trusted remote site and to establish a second session with an unprotected remote site without terminating the first session. The browser context monitor may be configured to determine whether the first session or the second session is active. The tunnel device may be configured to transmit data through a tunnel based on the determination. The system may further comprise a router configured to receive the data through the tunnel. The router may be further configured to discard the data.

With respect to the system above, the tunnel device may be further configured to transmit data through a persistent site tunnel to the trusted remote site until the first session is terminated. The determination may indicate that the first session is active.

In some embodiments, the browser is further configured to transmit unencrypted data to the unprotected remote site based on the determination. The determination may indicate that the second session is active.

The tunnel device may be further configured to transmit data to the trusted remote site through the persistent site tunnel when the second session is active. Further, the browser may be further configured to transmit unencrypted data to a second unprotected remote site when the determination indicates that the second session is active.

A method for performing various embodiments may comprise establishing a first session with a trusted remote site, establishing a second session with an unprotected remote site without terminating the first session, determining whether the first session or the second session is active, and transmitting data through a tunnel to the unprotected remote site based on the determination. The method may further comprise transmitting data through a persistent site tunnel to the trusted remote site until the first session is terminated, receiving the data through the tunnel, and/or discarding the data.

With respect to the method above, in some embodiments, transmitting data through the tunnel to the unprotected remote site based on the determination comprises transmitting data through the tunnel to the unprotected remote site when the first session is active.

The method may further comprise transmitting unencrypted data to the unprotected remote site based on the determination. Transmitting unencrypted data to the unprotected remote site based on the determination may comprise transmitting unencrypted data to the unprotected remote site when the second session is active.

The method may further comprise transmitting data to the trusted remote site through the persistent site tunnel when the second session is active.

In various embodiments, a system comprises a means for establishing a first session with a trusted remote site and a second session with an unprotected remote site without terminating the first session, a means for determining whether the first session or the second session is active, and a means for transmitting data through a tunnel to the unprotected remote site based on the determination. The system may further comprise a means for receiving the data through the tunnel. The means for receiving the data through the tunnel is configured to discard the data.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites.

The various embodiments set forth herein may be implemented utilizing hardware, software, or any desired combination thereof. When implemented in software, a processor may execute instructions for performing some or all functions described herein. The executable instructions may be stored in a computer readable medium or media. The computer readable medium may include any form of memory such as, but hot limited to, RAM, ROM, NAND, NOR, hard disk, flash, CD ROM, DVD, etc. For that matter, any type of logic may be utilized which is capable of implementing the various functions set forth herein. Components may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system comprising:
an end-user device configured to receive a security policy from a website during a website session with the website, the security policy being based on security demands of a particular section of the website associated with an increased data security risk; and
a security component on the end-user device configured to use the security policy to activate a security mechanism to temporarily protect the end-user device while a user visits the particular section of the website from operations of malicious code that may be on the end-user device, the security component configured to activate the security mechanism at an activation point corresponding to the user visiting the particular section of the website associated with the increased data security risk, the security component further configured to deactivate the security mechanism at a deactivation point corresponding to the user navigating away from the particular section of the website associated with the increased data security risk.

2. The system of claim 1, wherein the end-user device receives the security policy from the website upon connection to the website after at least one of an SSL, SSH, or PKI session has been established.

3. The system of claim 1, wherein the security mechanism includes at least one of cross site scripting protection, resource access controls, HTML data integrity protection using checksums keylogger controls I/O access controls browser cache access controls, or network access controls.

4. The system of claim 1, wherein the activation point corresponds to an explicit trigger point identifying a protected portion of the website or a secure website.

5. The system of claim 4, wherein the explicit trigger point includes a metatag embedded in the website.

6. The system of claim 5, wherein the metatag comprises a checksum metatag.

7. The system of claim 1, wherein the activation point corresponds to an implicit trigger point identifying a change in a domain name system (DNS) identifier.

8. The system of claim 1, wherein the activation point corresponds to an implicit trigger point identifying a change in a uniform resource locator (URL) identifier.

9. The system of claim 1, wherein the security component connects to the website via a point-to-point tunnel before executing the security policy.

10. The system of claim 1, wherein the website includes an integrity checksum embedded in the website, and the security component includes a website integrity checker to use the integrity checksum to confirm that the website has not been modified during transport.

11. The system of claim 1, wherein the security policy identifies alias and affiliate servers where a browser may navigate without raising concern.

12. A method for execution on an end-user device comprising a browser and a security component, the end-user device possibly including malicious code capable of data theft, the method comprising:
accessing, by the browser, a website during a website session;
receiving, by the end-user device, a security policy during the website session in response to accessing the website, the security policy being based on security demands of a particular section of the website associated with an increased data security risk;
activating, by the security component, a security mechanism using the security policy to temporarily protect the end-user device while a user visits the particular section of the website from operations of the malicious code capable of data theft that may be on the end-user device, the security component configured to activate the security mechanism at an activation point corresponding to the user visiting the particular section of the website associated with the increased data security risk; and
deactivating, by the security component, the security mechanism at a deactivation point corresponding to the user navigating away from the particular section of the website associated with the increased data security risk.

13. The method of claim 12, wherein the receiving of the security policy from the website occurs upon connection to the website after at least one of an SSL, SSH, or PKI session has been established.

14. The method of claim 12, wherein the security mechanism includes at least one of cross site scripting protection, resource access controls, HTML data integrity protection using checksums keylogger controls I/O access controls browser cache access controls, or network access controls.

15. The method of claim 12, wherein the activation point corresponds to an explicit trigger point identifying a protected portion of the website or a secure website.

16. The method of claim 15, wherein the explicit trigger point includes a metatag embedded in the website.

17. The method of claim 16, wherein the metatag comprises a checksum metatag.

18. The method of claim 12, wherein the activation point corresponds to an implicit trigger point identifying a change in a domain name system (DNS) identifier.

19. The method of claim 12, wherein the activation point corresponds to an implicit trigger point identifying a change in a uniform resource locator (URL) identifier.

20. The method of claim 12, further comprising connecting, by the security component, to the website via a point-to-point tunnel before executing the security policy.

21. The method of claim 12, wherein the website includes an integrity checksum embedded in the website, and further comprising using the integrity checksum, by the security component, to confirm that the website has not been modified during transport.

22. The method of claim 12, wherein the security policy identifies alias and affiliate servers where the browser may navigate without raising concern.

23. A system comprising:
  means for accessing a website during a website session by an end-user device, the end-user device possibly including malicious code capable of data theft;
  means for receiving, at the end-user device, a security policy during the website session in response to accessing the website, the security policy being based on security demands of a particular section of the website associated with an increased data security risk;
  means for activating a security mechanism on the end-user device using the security policy to temporarily protect the end-user device while a user visits the particular section of the website from operations of the malicious code that may be on the end-user device, the security component configured to activate the security mechanism at an activation point corresponding to the user visiting the particular section of the website associated with the increased data security risk; and
  means for deactivating the security mechanism at a deactivation point corresponding to the user navigating away from the particular section of the website associated with the increased data security risk.

* * * * *